(12) United States Patent
Tsukada

(10) Patent No.: US 8,923,575 B2
(45) Date of Patent: Dec. 30, 2014

(54) COLOR IMAGE PROCESSING METHOD, COLOR IMAGE PROCESSING DEVICE, AND COLOR IMAGE PROCESSING PROGRAM

(75) Inventor: Masato Tsukada, Tokyo (JP)

(73) Assignee: NEC Corporation, Tokyo (JP)

( * ) Notice: Subject to any disclaimer, the term of this patent is extended or adjusted under 35 U.S.C. 154(b) by 18 days.

(21) Appl. No.: 13/702,278

(22) PCT Filed: Jun. 28, 2011

(86) PCT No.: PCT/JP2011/003680
§ 371 (c)(1),
(2), (4) Date: Dec. 5, 2012

(87) PCT Pub. No.: WO2012/001948
PCT Pub. Date: Jan. 5, 2012

(65) Prior Publication Data
US 2013/0089256 A1 Apr. 11, 2013

(30) Foreign Application Priority Data
Jun. 30, 2010 (JP) .................. 2010-149233

(51) Int. Cl.
G06K 9/00 (2006.01)
G06K 9/40 (2006.01)
G06K 9/32 (2006.01)
H04N 1/62 (2006.01)

(52) U.S. Cl.
CPC .. G06K 9/00 (2013.01); H04N 1/62 (2013.01); H04N 1/628 (2013.01)
USPC ............................ 382/119; 382/167; 382/266

(58) Field of Classification Search
None
See application file for complete search history.

(56) References Cited

U.S. PATENT DOCUMENTS 7,016,075 B1 3/2006 Tsukada
8,090,160 B2 * 1/2012 Kakadiaris et al. ........... 382/118
(Continued)

FOREIGN PATENT DOCUMENTS

JP H04289978 A 10/1992
JP 2001052144 A 2/2001
(Continued)

OTHER PUBLICATIONS

Dubout, C.; Tsukada, M.; Ishiyama, R.; Funayama, C.; Susstrunk, S., "Face image enhancement using 3D and spectral information," Image Processing (ICIP), 2009 16th IEEE International Conference on, vol., No., pp. 697,700, Nov. 7-10, 2009.*

(Continued)

Primary Examiner — Andrae S Allison
(74) Attorney, Agent, or Firm — Sughrue Mion, PLLC

(57) ABSTRACT

An object area detection means detects an object area which is an area to be subjected to image processing from an input image. A reflection component reconstruction means calculates color information of the object area and a perfect diffusion component, which is a low-frequency component of the object area, and reconstructs a surface reflection component based on the color information and the low-frequency component. An albedo calculation means calculates an albedo, which is color information obtained by removing shading information, which is information that represents luminance of the perfect diffusion component, from the perfect diffusion component. An albedo correction processing means reconstructs a surface reflectance of the object area based on the albedo and the color information in the object area, and then calculates the corrected albedo, which is color information obtained by correcting the albedo based on the surface reflectance.

10 Claims, 13 Drawing Sheets

(56) References Cited

U.S. PATENT DOCUMENTS

| | | | | |
|---|---|---|---|---|
| 8,320,660 | B2* | 11/2012 | Ishiyama | 382/154 |
| 2005/0285860 | A1 | 12/2005 | Pfister et al. | |
| 2006/0227137 | A1 | 10/2006 | Weyrich et al. | |
| 2008/0212849 | A1* | 9/2008 | Gao | 382/118 |
| 2009/0129665 | A1* | 5/2009 | Ishiyama | 382/154 |
| 2009/0141976 | A1* | 6/2009 | Tsukada | 382/167 |
| 2010/0328740 | A1* | 12/2010 | Tsukada | 358/530 |
| 2011/0268350 | A1* | 11/2011 | Tsukada | 382/154 |
| 2011/0274351 | A1* | 11/2011 | Tsukada | 382/167 |
| 2013/0083969 | A1* | 4/2013 | Tsukada | 382/103 |

FOREIGN PATENT DOCUMENTS

| | | |
|---|---|---|
| JP | 3264273 A | 4/2001 |
| JP | 2002015311 A | 1/2002 |
| JP | H10229499 B1 | 7/2002 |
| JP | 2003317084 A | 11/2003 |
| JP | 2004045189 A | 2/2004 |
| JP | 2006004432 A | 1/2006 |
| JP | 2006277748 A | 10/2006 |
| JP | 2007208846 A | 8/2007 |
| WO | 2007007788 A1 | 1/2007 |
| WO | 2009104787 A1 | 8/2009 |

OTHER PUBLICATIONS

The International search report for PCT/JP2011/003680 mailed on Aug. 16, 2011.

Hosoi Toshinori, Suzuki Tetsuaki, and Sato Atsushi, "Face Detection based on Generalized Learning Vector Quantization", FIT2002, I-30, Sep. 2002.

Tajima Johji, "Image Engineering Series 10, Color Image Duplication Theory, Basics of Color Management", Maruzen Corporation, Sep. 30, 1996, p. 33-39.

Ishiyama Rui, "Recognition of Non-Frontal Facial Images by Pose Conversion using General 3D Face Model", Proceedings of the IEICE (Institute of Electronics, Information, and Communication Engineers) General Conference 2007, D-12-085, 2007, p. 201.

Masato Tsukada et al., "Face Image Enhancement Based on 3D and Spectral Information", FIT2009 Dai 8 Kai Forum on Information Technology Koen Ronbunshu, separate vol. 3, Aug. 20, 2009, pp. 273-274.

Takahiro Okabe, Yoichi Sato, "Separation of Reflection Components Based on Frequency Characteristics of Bidirectional Reflectance Distribution Functions", IPSJ SIG Notes, Sep. 12, 2002, vel.2002, No. 84, pp. 1-8.

Rui Ishiyama, Masato Tsukada, "Specularity Removal for Enhancing Face Recognition under Variable Pose and Illumination", FIT2009 Dai 8 Kai Forum on Information Technology Koen Ronbunshu, separate vol. 3, Aug. 20, 2009, pp. 111-112.

Masato Tsukada, Yuichi Ota, "Color Reproduction based on Memory Color and Its Application for Image Quality Improvement", The Journal of the Institute of Image Information and Television Engineers, Mar. 1, 2006, vol. 60, No. 3, pp. 348-357.

* cited by examiner

COLOR IMAGE PROCESSING METHOD, COLOR IMAGE PROCESSING DEVICE, AND COLOR IMAGE PROCESSING PROGRAM

TECHNICAL FIELD

The present invention relates to image processing on color images, and more particularly to a color image processing method, a color image processing device, and a color image processing program for performing image processing of correcting a color image that is actually captured using an imaging device to improve the texture of an object in the image.

BACKGROUND ART

As a technique of improving the quality of a color image captured by a color image capturing device, various techniques of making the color of a specific object (for example, flesh color, green of plants (foliage), and a blue sky) in a color image closer to the memory color of the object have been proposed. The use of these methods enables desirable colors to be reproduced.

For example, Patent Literature 1 discloses a technique of correcting the color of color images. In an automatic color correction method disclosed in Patent Literature 1, a representative color is extracted from an object area in an image, and the representative color is compared with a predetermined central color for correction to determine RGB correction parameters. Moreover, each pixel is corrected by controlling application strength of the correction parameters according to the distance between the pixels in the image and the central color.

Specifically, in the method disclosed in Patent Literature 1, the hue, saturation, and lightness of the respective pixels are calculated from the RGB values which are the color information of the respective pixels. Moreover, the distance between the color of each pixel in a color space and the central color for correction is calculated, and the correction strength is adjusted according to the distance. In this way, the color of an object is intensively corrected.

In this technique, color correction is performed based on the addition and subtraction of correction parameters in the RGB color space. For example, in the case of flesh color of a human face, the RGB correction amount is calculated for each pixel according to the distance between each color and the central color for correction. If the whole face area is lightened, a correction parameter corresponding to the distance from the central color for correction is added to or subtracted from the RGB values of each pixel located in substantially the entire face area.

Patent Literature 2 discloses a technique of detecting a face area in an input image. According to an eye detection method disclosed in Patent Literature 2, even if it is not possible to discriminate eyes from the other portions due to deficient features when a single eye is evaluated, the eyes and the other portions are discriminated using an evaluation value of a pair of eyes based on the features of the pairs of eyes.

In addition to the above patent literatures, Patent Literatures 3 to 5 disclose techniques related to color image correction processes. Patent Literature 3 discloses a color correction device and method in which when color correction is performed on image data of spectral colors, the color space of the spectral colors is converted into a color space having a lower dimension than the original dimension, color correction is performed in the low-dimensional color space, and spectral colors of an appropriate dimension are generated from the spectral colors of the lower dimension.

Patent Literature 4 discloses a color conversion method of converting an original color space into a target color space between color systems having different reference white colors without changing the way in which colors are viewed. Specifically, in the color conversion method disclosed in Patent Literature 4, the spectral distribution characteristics of the original reference white color are reconstructed from the color temperature of the original reference white color which is the reference white color of the original color space. Moreover, the spectral distribution characteristics of the target reference white color are reconstructed from the color temperature of the target reference white color which is the reference white color of the target color space. Further, the surface reflectance of an optional color in the original color space is reconstructed using the tristimulus values of the optional color, the spectral distribution characteristics of the original reference white color, and the color matching functions of the human beings. Furthermore, the tristimulus values which are the colors in the target color space are obtained based on the reconstructed surface reflectance, the reconstructed spectral distribution characteristics of the target reference white color, and the color matching functions of the human beings.

Patent Literature 5 discloses a technique of automatically performing favorable color correction with respect to an important subject in an image of the nature, captured under various illumination environments. Specifically, in the color correction method disclosed in Patent Literature 5, a body surface color of a specific object is extracted, and optimal color correction parameters are set for the extracted body surface color. Color correction conversion that is applied to only a specific color is performed using the parameters. By performing such conversion, it is possible to automatically perform color correction with respect to an important subject in the image of the nature captured under various illumination environments.

Moreover, Patent Literature 6 discloses a technique of generating a skin reflection model of a human face to apply the model to rendering of a facial image. In the method disclosed in Patent Literature 6, first, the human face is scanned using a 3D scanner to acquire a 3-dimensional shape. In this case, a plurality of facial images is acquired by illuminating the face from different directions and different viewpoints. Moreover, a total reflectivity and a normal map are estimated using the surface scan data and the image data. Moreover, the total reflectivity is divided into two components of an under-surface scattering component and a (specular) surface reflectivity component, and a diffusion reflectivity is estimated based on these components. Further, the under-surface reflectivity is scanned using a fiber-optic spectrometer to obtain a transmittance map. The skin reflection model of the face is formed based on the transmittance map and an albedo map that is obtained from the diffusion reflectivity.

In addition to the above patent literatures, Patent Literature 7 discloses an image processing device in which when an area to be subjected to image processing, to which a dichroic reflection model can be applied, is designated, pixel values of the area are divided into a surface reflection light component and a diffused reflection light component according to the Klinker method. Patent Literature 8 discloses a shadow removal device that removes shadow from an input image using 3-dimension information in response to a shadow removal request. Patent Literature 9 discloses an image processing device in which when gradation correction is performed on an image captured against the sun, the image data of a high-resolution picture is divided into a low-frequency component and a high-frequency component, and the low-frequency component is used as a processing mask of the gradation correction. Moreover, Patent Literature 10 discloses a 2-dimensional color image texture conversion method in which when a user manually designates a shade portion, the light component of an original image is divided into a diffused reflection light component, a specular reflection light component, and a surrounding light component, and the respective light components are recombined after converting the divided specular reflection light component.

Further, Non Patent Literature 1 discloses a face detection method using generalized learning vector quantization. Moreover, Non Patent Literature 2 discloses a face detection method using generalized learning vector quantization in which an image-based face detection method and a feature-based face detection method of detecting eye are combined.

Moreover, as a method of obtaining a 3-dimensional shape of the face, in addition to the method that uses a 3D scanner disclosed in Patent Literature 6, a method of reconstructing the face information of a 3-dimensional shape (3-dimensional information) from a 2-dimensional facial image is also known (for example, Non Patent Literature 3).

The contents disclosed in Patent Literatures 1 and 2 and the contents discloses in Non Patent Literatures 1 to 3 are appropriately referenced in the exemplary embodiments of the present invention.

CITATION LIST

Patent Literature

PLT 1: Japanese Patent No. 3264273
PLT 2: Japanese Patent Application Laid-Open (JP-A) No. 2003-317084
PLT 3: JP-A No. 2004-45189
PLT 4: JP-A No. 10-229499
PLT 5: JP-A No. 2001-92956
PLT 6: JP-A No. 2006-277748
PLT 7: JP-A No. 2001-52144
PLT 8: JP-A No. 2002-15311
PLT 9: JP-A No. 2007-208846
PLT 10: JP-A No. 4-289978

Non Patent Literature

NPL 1: Hosoi Toshinori, Suzuki Tetsuaki, and Sato Atsushi, "Face Detection based on Generalized Learning Vector Quantization", FIT2002, I-30, September 2002
NPL 2: Tajima Johji, "Image Engineering Series 10, Color Image Duplication Theory, Basics of Color Management", Maruzen Corporation, Sep. 30, 1996, p. 33-39
NPL 3: Ishiyama Rui, "Recognition of Non-Frontal Facial Images by Pose Conversion using General 3D Face Model", Proceedings of the IEICE (Institute of Electronics, Information, and Communication Engineers) General Conference 2007, D-12-085, 2007, p. 201

SUMMARY OF INVENTION

Technical Problem

As in the color correction method disclosed in Patent Literature 1, in a method that uses the RGB of color image data and the three attributes of a color such as hue, saturation, and lightness, there is a case where the original texture of an object deteriorates. This is because, when the color of a certain object in an image is corrected so as to make the image lighter, it causes such a phenomenon that a color component (for example, a red component) which originally has a high pixel value is saturated, and a correction parameter is added to or subtracted from the other color components (for example, green and blue components). If this process is carried out for the entire object area, the dispersion of the color information or the pixel values in the object area becomes narrower, and the apparent texture in the object area deteriorates.

Moreover, Patent Literature 6 proposes the human skin reflection model applied to the rendering of facial images. However, the method disclosed in Patent Literature 6 requires a 3D scanner and a fiber-optic spectrometer which is a special measurement device in order to obtain 3-dimensional information of the facial image. Therefore, it is difficult to apply this method to color correction performed by such an ordinary color image processing device that uses only an input image.

In order to solve the problems, as disclosed in Non Patent Literature 3, it is possible to use a technique of reconstructing a 3-dimensional facial image from a 2-dimensional facial image as a method of obtaining 3-dimensional information of a facial image. However, when color correction is performed by ordinary color image processing, it is preferable to suppress the computation costs further than the reconstruction technique disclosed in Non Patent Literature 3.

That is, in color image processing which uses only an input color image, it is preferable to apply a technique capable of further suppressing the computation costs of the image processing and suppressing deterioration of the texture in an object area present in a color image.

Therefore, an exemplary object of the present invention is to provide a color image processing method, a color image processing device, and a color image processing program capable of reproducing a specific object in a color image captured by a color image device in desired colors at a computation low cost to improve the texture.

Solution to Problem

A color image processing method according to the present invention includes: detecting an object area which is an area to be subjected to image processing from an input image; calculating color information of the object area and a perfect diffusion component which is a low-frequency component of the object area; reconstructing a surface reflection component based on the color information and the low-frequency component; calculating an albedo, which is color information obtained by removing shading information which is information that represents luminance of the perfect diffusion component, from the perfect diffusion component; reconstructing the surface reflectance of the object area based on the color information and the albedo of the object area; calculating a corrected albedo which is color information obtained by correcting the albedo based on the surface reflectance; calculating a reproduced color which is color information obtained by adding the shading information and the surface reflection component to the corrected albedo; and generating an output image based on the reproduced color.

A color image processing device according to the present invention includes: an object area detection means that detects an object area which is an area to be subjected to image processing from an input image; a reflection component reconstruction means that calculates color information of the object area and a perfect diffusion component which is a low-frequency component of the object area and reconstructs a surface reflection component based on the color information and the low-frequency component; an albedo calculation means that calculates an albedo which is color information obtained by removing shading information which is information that represents luminance of the perfect diffusion component, from the perfect diffusion component; an albedo correction means that reconstructs the surface reflectance of the object area based on the color information and the albedo of the object area and calculates a corrected albedo which is color information obtained by correcting the albedo based on the surface reflectance; and a reproduced color calculation means that calculates a reproduced color which is color information obtained by adding the shading information and the surface reflection component to the corrected albedo and generates an output image based on the reproduced color.

A color image processing program according to the present invention causes a computer to execute: an object area detection process for detecting an object area which is an area to be subjected to image processing from an input image; a reflection component reconstruction process for calculating color information of the object area and a perfect diffusion component which is a low-frequency component of the object area and reconstructing a surface reflection component based on the color information and the low-frequency component; an albedo calculation process for calculating an albedo which is color information obtained by removing shading information which is information that represents luminance of the perfect diffusion component, from the perfect diffusion component; an albedo correction process for reconstructing the surface reflectance of the object area based on the color information and the albedo of the object area and calculating a corrected albedo which is color information obtained by correcting the albedo based on the surface reflectance; and a reproduced color calculation process for calculating a reproduced color which is color information obtained by adding the shading information and the surface reflection component to the corrected albedo and generating an output image based on the reproduced color.

Advantageous Effects of Invention

According to the present invention, it is possible to reproduce a predetermined object in a color image captured by a color image device in a desired color at a computation low cost and improve the texture.

DESCRIPTION OF EMBODIMENTS

Figure 1:
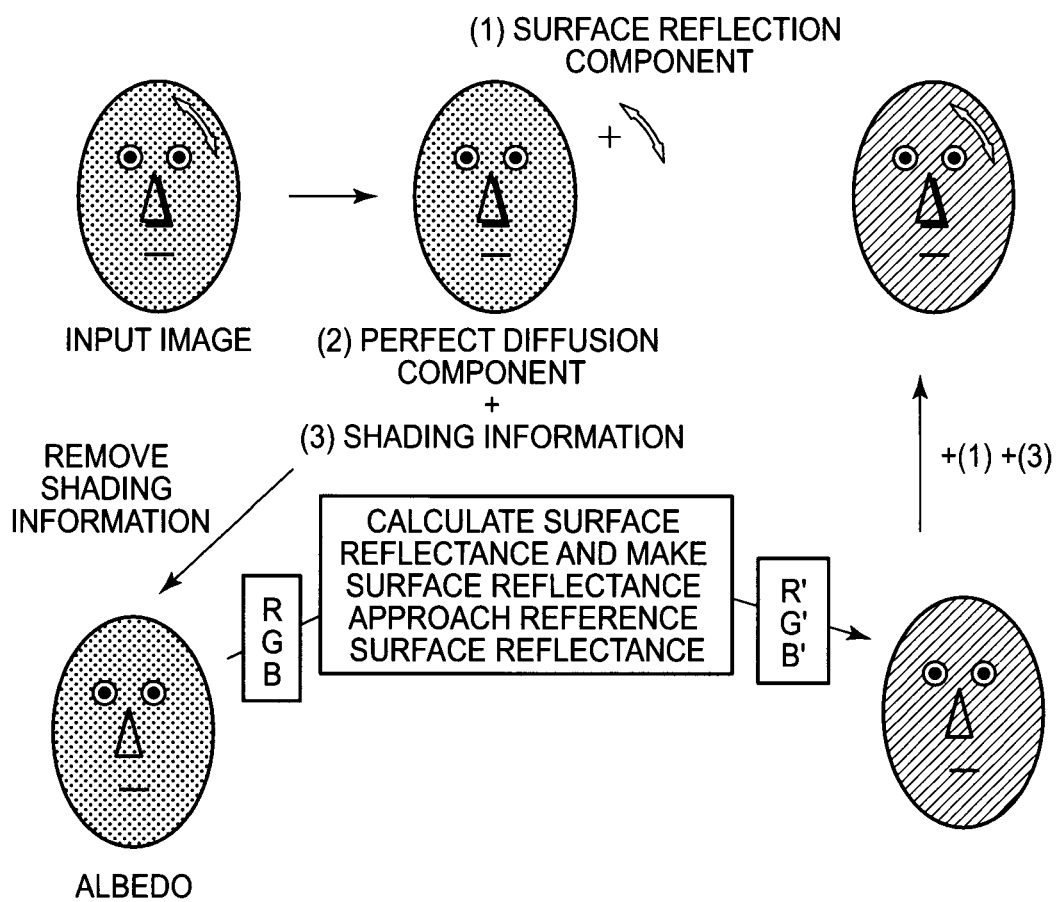
FIG. 1 It depicts an explanatory diagram illustrating an example of color image processing according to the present invention.

Hereinafter, exemplary embodiments of the present invention will be described with reference to the drawings. In order to clarify the description, schematic drawings are appropriately used in the following description. Moreover, in the drawings, constituent components having the same configurations or the same functions and portions corresponding to the constituent components will be denoted by the same reference numerals, and description of configurations or functions which have been described once will not be provided in the subsequent description.

First, an overview of an aspect of a color image processing method performed by a color image processing device according to the present invention will be described. In the color image processing method according to the present invention, when the color of a specific object in an input image is corrected, first, the color image processing device calculates a low-frequency component of the specific object in the input image. Subsequently, the color image processing device uses the calculated low-frequency component as a perfect diffusion component including shading information of the specific object. Moreover, the color image processing device subtracts the perfect diffusion component (including the shading information) from the input image to thereby calculate a surface reflection component (highlight) on the specific object.

Subsequently, the color image processing device removes the shading information from the perfect diffusion component (including the shading information) of the specific object to thereby obtain an albedo which is the original color information of the specific object. The color image processing device reconstructs the surface reflectance used when expressing the specific object using the albedo. Moreover, the color image processing device performs correction so that the reconstructed surface reflectance approaches a reference surface reflectance that is set in advance for each object as a more desirable surface reflectance to thereby calculate a corrected albedo. Finally, the color image processing device adds the surface reflection component and the shading information to the corrected albedo to thereby calculate reproduced color of the specific object. By doing so, it is possible to express the reproduced color obtained by correcting the color of the specific object in colors closer to the natural colors and more desirable colors.

The meanings of the words described in the overview of processing described above will be described later.

FIG. 1 is an explanatory diagram illustrating an example of a color image processing according to the present invention. Hereinafter, an overview of a color image processing method performed by a color image processing device according to the present invention will be further described with reference to FIG. 1.

I. First, the color image processing device acquires information on an input image that is input (hereinafter referred to as an image information acquisition process). Specifically, when the input image is input, the color image processing device specifies a specific object from the input image. The specific object is an area specified as an object to be corrected. The color image processing device specifies the specific object to thereby detect an area (hereinafter sometimes referred to as an object area) in which an albedo is corrected. Moreover, the color image processing device acquires color information (that is, color of the object area) of the specific object. Here, the albedo is the color information of the specific object itself, and specifically, is color information in which shine and shade are removed from the image information of the specific object (that is, the color information acquired from the input image).

II. Subsequently, the color image processing device reconstructs reflection information of the specific object (hereinafter referred to as a reflection information reconstruction process). Here, the reflection information is information on reflection light reflected from the specific object. The reflection information of the specific object is generally reconstructed based on a 3-dimensional shape of the specific object and geometric conditions of an illumination. On the other hand, in the color image processing method according to the present invention, a low-frequency component of the specific object is used instead of the 3-dimensional shape.

First, the color image processing device uses a perfect diffusion component including shading information as the low-frequency component of the specific object. Moreover, the color image processing device reconstructs the surface reflection component by removing the low-frequency component from the color information of the specific object. In this case, the color image processing device calculates the surface reflection component by subtracting the low-frequency component from the color information with respect to the pixel values of the respective pixels of the input image. In this way, the color information of the specific object is divided into the surface reflection component and the perfect diffusion component (that is, the perfect diffusion component including the shading information). That is, the surface reflection component is reconstructed.

Here, the surface reflection component is a component of reflection light reflected from the surface of an object and is information that represents so-called shine. Moreover, the perfect diffusion component is a low-frequency component of the specific object, and the shading information is information that represents the luminance of the perfect diffusion component.

III. The color image processing device calculates an albedo of the specific object (hereinafter referred to as an albedo calculation process). Specifically, the color image processing device calculates an albedo by subtracting the shading information from the perfect diffusion component (including the shading information) which is the low-frequency component of the specific object. Due to this, the albedo can be said to be the color information in which the shading information is excluded from the perfect diffusion component which is the color information obtained by removing the surface reflection component from the color information of the specific object. That is, the color information in which the surface reflection component (shine) and the shading information (shadow) are removed from the image information (the color information acquired from the input image) of the specific object is the albedo. In other words, it can be said that the shading information is included in the perfect diffusion component. Moreover, it can be said that the color information of the object area is expressed as information in which the surface reflection component is added to the product of the albedo and the shading information.

IV. The color image processing device corrects the albedo (hereinafter referred to as an albedo correction process). Specifically, the color image processing device calculates the surface reflectance using the color information and the albedo of the specific object. Moreover, the color image processing device performs correction so that the calculated surface reflectance approaches a reference surface reflectance. The color image processing device corrects the albedo using the corrected surface reflectance. Here, the reference surface reflectance is a surface reflectance that is set in advance for the specific object. The reference surface reflectance will be described below.

V. The color image processing device calculates a reproduced color by adding the surface reflection component and the shading information to the corrected albedo (hereinafter referred to as a reproduced color calculation process).

In the following description, it is assumed that an object area detected from a specific object is made up of a plurality of pixels. Moreover, it is assumed that each pixel has color information. Further, it is assumed that the color information is sometimes referred to as a pixel value. It is assumed that the color information includes at least a surface reflection component and a perfect diffusion component (including shading information). The color information may include information on colors other than the above. Moreover, in the following description, the specific object and the object area are not distinguished from each other. The configuration of the color image processing device that performs the above-described respective processes will be described below.

Figure 2:
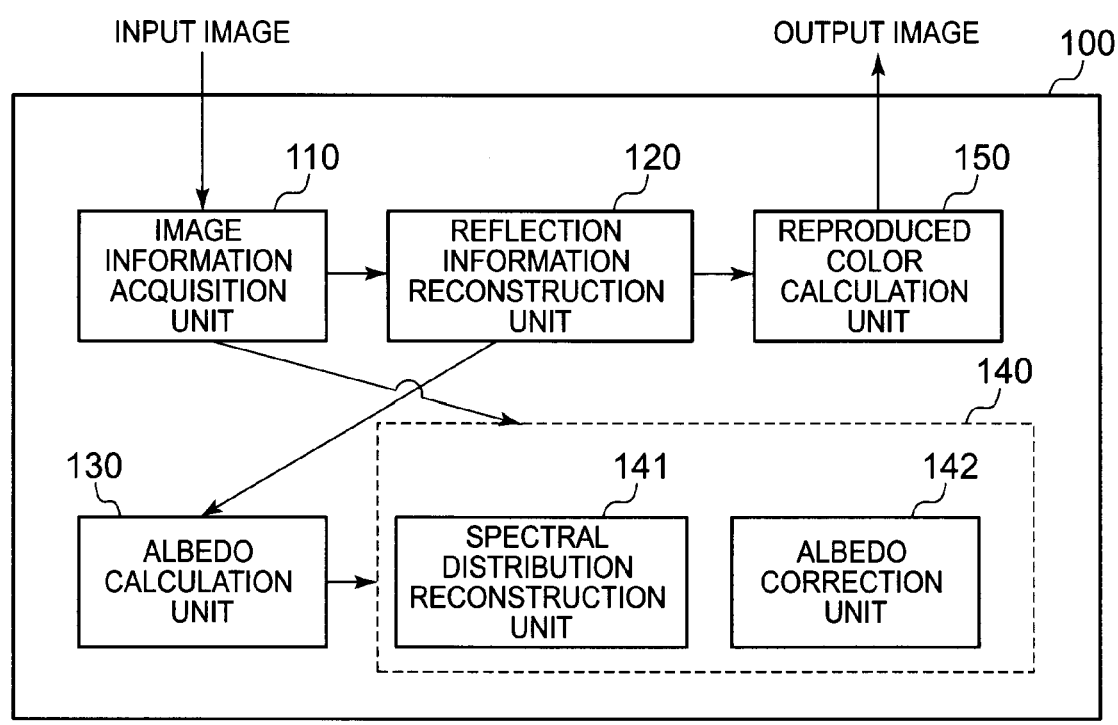
FIG. 2 It depicts a block diagram illustrating an exemplary embodiment of a color image processing device according to the present invention.

Next, the configuration of the color image processing device according to the present invention will be described. FIG. 2 is a block diagram illustrating an exemplary embodiment of the color image processing device according to the present invention. A color image processing device 100 illustrated in FIG. 2 includes an image information acquisition unit 110, a reflection information reconstruction unit 120, an albedo calculation unit 130, an albedo correction processing unit 140, and a reproduced color calculation unit 150.

The image information acquisition unit 110 specifies a specific object based on an input image input from the outside and detects an object area of the specific object. Moreover, the image information acquisition unit 110 acquires the color information of the object area.

The reflection information reconstruction unit 120 calculates a low-frequency component of the object area. The calculated low-frequency component is the perfect diffusion component that includes the shading information of the object area. Moreover, the reflection information reconstruction unit 120 removes the perfect diffusion component from the color information of the object area to thereby reconstruct the surface reflection component of the object area. That is, the color information of the object area is divided into a surface reflection component (shine) and a perfect diffusion component, which are reconstructed as respective components.

The albedo calculation unit 130 calculates an albedo. Specifically, the albedo calculation unit 130 calculates the albedo by dividing the perfect diffusion component of the object area by the shading information (that is, excluding the shading information from the perfect diffusion component).

The albedo correction processing unit 140 reconstructs the surface reflectance using the color information and the albedo and calculates color information (hereinafter referred to as a corrected albedo) in which the albedo is corrected using the surface reflectance. The albedo correction processing unit 140 includes a spectral distribution reconstruction unit 141 and an albedo correction unit 142. The spectral distribution reconstruction unit 141 reconstructs a spectral distribution of an illumination using the color information of the object area. The albedo correction unit 142 reconstructs the surface reflectance of the object area using the albedo and the reconstructed spectral distribution of the illumination. Moreover, the albedo correction unit 142 calculates the corrected albedo by correcting the albedo based on the reconstructed surface reflectance.

The reproduced color calculation unit 150 adds the shading information and the surface reflection component to the corrected albedo to thereby calculate a reproduced color of the object area. Moreover, the reproduced color calculation unit 150 generates an output image using the calculated reproduced color.

Hereinafter, the operation of the color image processing device according to the present invention will be described with reference to respective exemplary embodiments.

First Exemplary Embodiment

Figure 3:
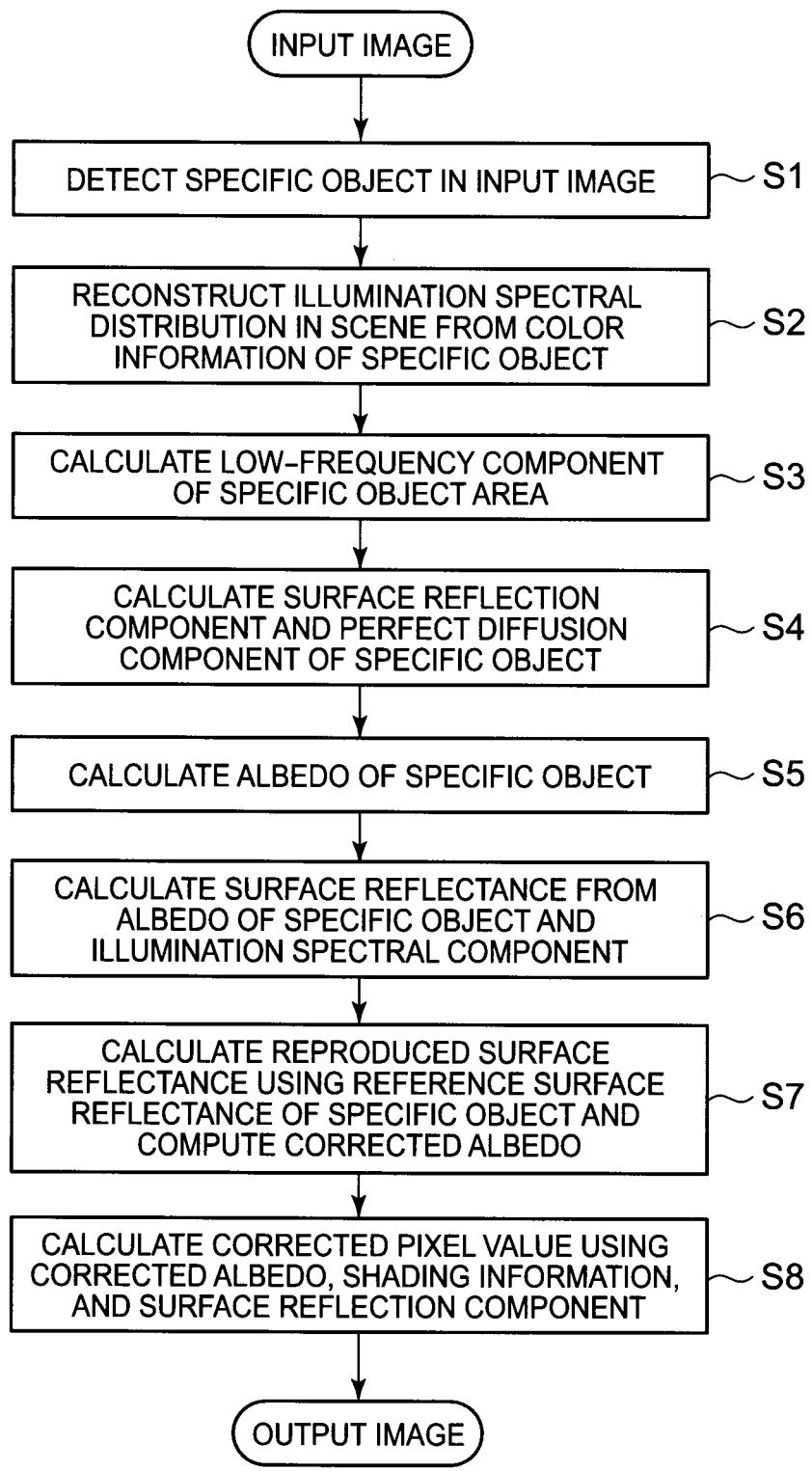
FIG. 3 It depicts a flowchart illustrating an example of a color image processing method according to a first exemplary embodiment of the present invention.

First, the flow of the processes of a color image processing method according to a first exemplary embodiment of the present invention will be described with reference to the drawings. FIG. 3 is a flowchart illustrating an example of the color image processing method according to the first exemplary embodiment of the present invention. In the following description, it is assumed that the color image processing method according to the exemplary embodiment is realized using the color image processing device 100 illustrated in FIG. 2. Moreover, in the following description, it is assumed that the color system of an image is an RGB color system. That is, it is assumed that the color of an image is represented by a combination of R (red), G (green), and B (blue). Hereinafter, it is assumed that the color information of an input image is represented as color information RGB. However, the color system of an image is not limited to the RGB color system. The color system of an image may be other color systems than the RGB color system.

Hereinafter, the operation of the color image processing device 100 illustrated in FIG. 2 to recalculate a reproduced color of each pixel of an object area in a color image in order to improve the texture of the specific object in an optional color image will be described.

First, the image information acquisition unit 110 automatically detects a specific object from an input image (step S1). In this case, the image information acquisition unit 110 acquires the color information of the object area in the detected specific object. Here, the automatic detection of the specific object from the input image means detecting a predetermined object (for example, the face of a human) from an input image as a specific object and detecting an object individually designated by a user as a specific object.

Here, the individual objects detected as the specific object may be different from each other. That is, even when there is an individual difference, since rough color information and texture are universal, the specific object is not limited to a particular individual object as long as it can be specified as a supposed object from the features obtained from the color image.

Figure 4:
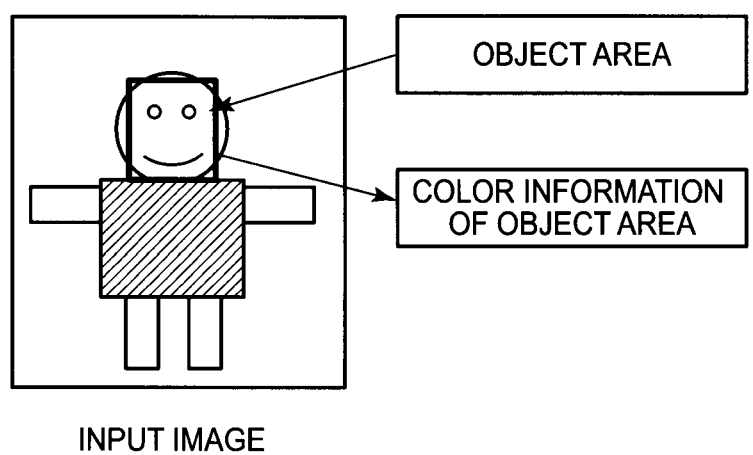
FIG. 4 It depicts an explanatory diagram illustrating an example of a process of detecting an object area in an input image and obtaining color information.

FIG. 4 is an explanatory diagram illustrating an example of a process of detecting an object area in an input image to obtain color information. In the example of FIG. 4, the object area is the face of a human, and the color information is acquired from the object area. The image information acquisition unit 110 detects a specific object using the color information, the texture, and the like from the color image illustrated in FIG. 4. Hereinafter, a case where the specific object is the face of a human will be described.

When the specific object is the face of a human, the image information acquisition unit 110 detects a face area using the shape features of eyes, a nose, and a mouth. The image information acquisition unit 110 may use the face detection method disclosed in Non Patent Literature 2, for example, as a method of detecting a face area. As described above, the face detection method disclosed in Non Patent Literature 2 is a method using generalized learning vector quantization in which an image-based face detection method and a feature-based face detection method of detecting eyes are combined.

In addition to the above, the image information acquisition unit 110 may use a method of detecting eyes from an image, disclosed in Patent Literature 2, for example, as a method of detecting a face area from an input image. It is easy to estimate a face area as long as the position of eyes can be detected from an input image.

In the face detection method disclosed in Non Patent Literature 2 and the eye detection method disclosed in Patent Literature 2, the face is detected using monochrome information. The image information acquisition unit 110 also determines whether the face area which is the detection result has a flesh color. By adding such a determination process, it is possible to improve the detection accuracy of the face area. As a method of determining whether a designated area has a flesh color, an image histogram disclosed in Patent Literature 1, for example, may be used.

The method of the image information acquisition unit 110 to detect a face area from an input image is not limited to the above method. Moreover, in the above description, a case where the object that is automatically detected from an optional input image is the face of a human has been described. However, the object detected automatically is not limited to the face of a human. When an object other than the human face is automatically detected, the image information acquisition unit 110 may automatically detect an object by comparing visual feature information of an object area, registered in advance with visual characteristic information of the image data, for example.

Subsequently, the spectral distribution reconstruction unit 141 reconstructs color information of an illumination when the input image was captured based on the color information (the color of the object area) of the specific object in the input image (step S2). Specifically, the spectral distribution reconstruction unit 141 calculates the spectral distribution of the illumination when the input image was captured. In this example, it is assumed that the spectral distribution reconstruction unit 141 reconstructs the color information of the illumination (specifically, the spectral distribution characteristics of the illumination) that is estimated to be used when the input image was captured, using the color information of the object area in the color image and the surface reflection characteristics of the object.

First, the spectral distribution reconstruction unit 141 acquires the color information RGB of the object area and obtains the tristimulus values XYZ of the XYZ color system based on the acquired color information RGB. Moreover, the spectral distribution reconstruction unit 141 reconstructs the spectral distribution from the tristimulus values XYZ of the object area and the surface reflectance of the object. Hereinafter, the process of the spectral distribution reconstruction unit 141 to obtain the color information of the object area indicated by the specific object that is automatically detected from the input image will be described in detail.

In this example, it is assumed that the image information acquisition unit 110 acquires the color information RGB of the object area, and the spectral distribution reconstruction unit 141 obtains the tristimulus values XYZ of the XYZ color system based on the color information RGB. Moreover, the spectral distribution reconstruction unit 141 may use anyone of a mean color, a median color (median), and a mode color (mode) of pixels present in an area occupied by the object, for example, as the color information of the object area.

Moreover, it is assumed that the chromaticity of RGB phosphor and the chromaticity of white in the color information RGB are designated in advance. Moreover, it is assumed that the relation between the color information RGB and the emission intensity of a display device is linear. In this case, the relation between the color information RGB of the input image and the tristimulus values XYZ is expressed by Equation (1) shown below.

[Formula 1]

$$\begin{pmatrix} X \\ Y \\ Z \end{pmatrix} = RX \begin{pmatrix} R \\ G \\ B \end{pmatrix} \quad \text{Equation (1)}$$

Here, RX is a 3×3 transformation matrix. This transformation matrix RX is a matrix that is uniquely defined if the chromaticity of the RGB phosphor and the chromaticity of white are determined. The spectral distribution reconstruction unit 141 may use a calculation method disclosed in Non Patent Literature 2, for example, as a method of calculating the transformation matrix RX. Moreover, a display device (not illustrated) that displays color images is an sRGB (Standard RGB) display, the spectral distribution reconstruction unit 141 may use a transformation matrix specified by the International Electrotechnical Commission (IEC) as the transformation matrix. Further, XYZ values that represent black may be added to the relational expression illustrated in Equation (1) as an offset term.

Subsequently, the spectral distribution reconstruction unit 141 calculates the spectral distribution of the illumination, which is the color information of the illumination when the input image was captured. Here, the illumination used when the input image was captured is an illumination (light source) that illuminates the object in the input image.

The spectral distribution reconstruction unit 141 generates an observation equation for reconstructing the spectral distribution from the tristimulus values XYZ of the object area calculated by Equation (1) and the surface reflectance of the object. The tristimulus values XYZ indicating the color of the object area represented based on the XYZ color system is expressed by Equation (2) shown below using the surface reflectance of the object area, the spectral distribution of the illumination illuminating the object, and the color matching functions of human vision.

[Formula 2]

$$X = \int I(\lambda) R(\lambda) x(\lambda) d\lambda$$

$$Y = \int I(\lambda) R(\lambda) y(\lambda) d\lambda$$

$$Z = \int I(\lambda) R(\lambda) z(\lambda) d\lambda \quad \text{Equation (2)}$$

Here, λ is wavelength, I(λ) is the spectral distribution of the illumination, and R(λ) is the surface reflectance of the object area. Functions x(λ), y(λ) and z(λ) are color matching functions, and are known functions. The integration is performed over the wavelength range of visible rays.

When the tristimulus values XYZ calculated by Equation (1) is substituted into the left-hand side of Equation (2), Equation (2) becomes an observation equation of the illumination spectral distribution I(λ) and R(λ), which are unknowns. However, in the current state, I(λ) and R(λ), which are continuous functions of the wavelength, cannot be calculated from Equation (2).

Here, it is assumed that the surface reflectance R(λ), which indicates the color of the object area, can be restricted or determined in advance even though it may have some degree of error. Then, R(λ) can be handled as a known value. In this case, Equation (2) becomes an observation equation of I(λ) alone.

Figure 5:
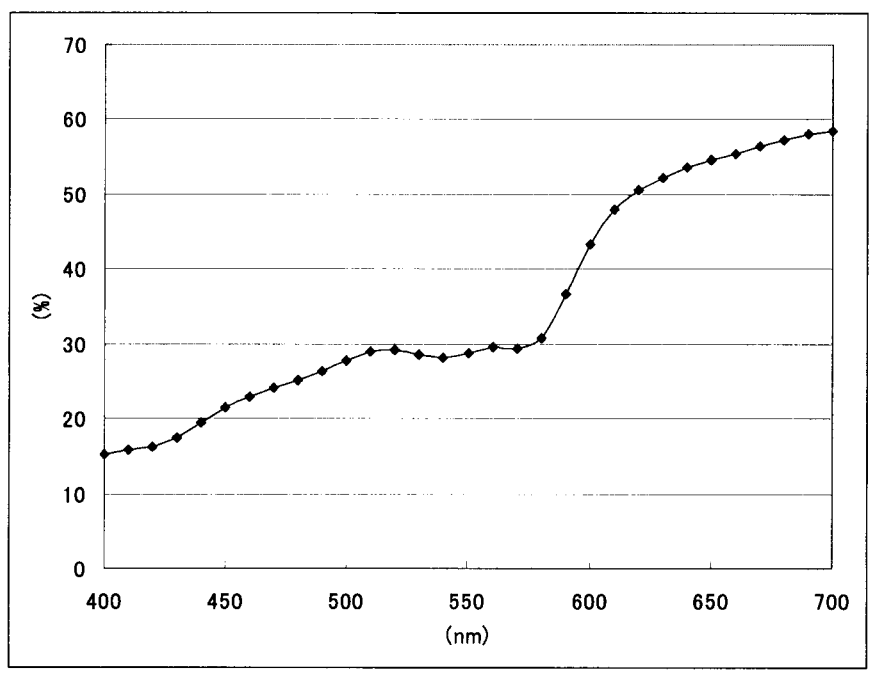
FIG. 5 It depicts a graph illustrating an example of a surface reflectance of a face area of a Japanese person having average flesh color.

FIG. 5 is a graph illustrating an example of a surface reflectance of a face area of a Japanese person having average flesh color. The horizontal axis of the graph illustrated in FIG. 5 indicates wavelength (nm), and the vertical axis indicates a surface reflectance (%). For example, if the object is the face of a Japanese person, a surface reflectance illustrated in FIG. 5 can be used as R(λ) in Equation (2).

Moreover, the object may not be a face. For example, the mean value of the surface reflectances obtained by measuring a plurality of objects or a surface reflectance of an object area selected as an area having a representative color may be obtained in advance, and the surface reflectance may be used as R(λ) of Equation (2). The surface reflectance of the object area is determined in advance and stored in a memory (not illustrated) of the color image processing device 100 and a memory (not illustrated) included in the albedo correction processing unit 140. As above, a representative surface reflectance of the object area determined in advance through measurement or the like can be referred to as a representative surface reflectance.

When R(λ) is determined, Equation (2) becomes an observation equation of the illumination spectral distribution I(λ). However, it is not possible to analytically calculate I(λ) in this state. This is because the illumination spectral distribution I(λ) is, intrinsically, expressed by an infinite-dimensional linear model in the visible-ray range. However, if I(λ) can be expressed by a small number of parameters, this problem will be solved.

Figure 6:
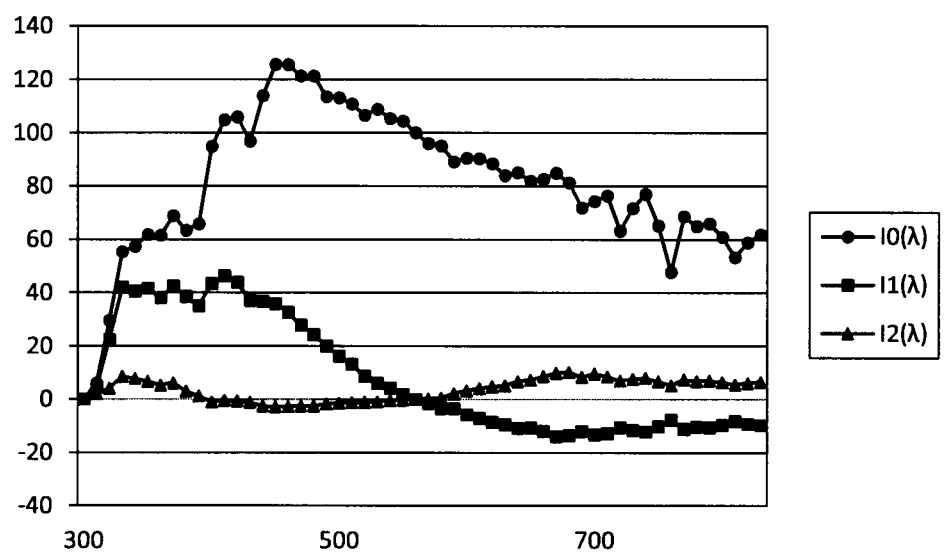
FIG. 6 It depicts a graph illustrating an example of a mean value and first and second principal component vectors of CIE daylight.

The CIE daylight is a light source for measurement that is specified by CIE (Commission Internationale de l'Eclairage) according to the relative spectral distribution, and is known to be satisfactorily approximated by a linear sum of a mean component and two principal components. FIG. 6 is a graph showing mean and, first and second principal component vectors of CIE daylight. The horizontal axis of the graph illustrated in FIG. 6 indicates wavelength (nm) and the vertical axis indicates spectral distribution spectral power at each wavelength of illumination or a light source. Moreover, I0 is the mean vector of CIE daylight, I1 indicates a first principal component vector, and I2 indicates a second principal component vector. From this, the illumination spectral distribution I(λ) can be expressed by Equation (3) blow.

[Formula 3]

$$I(\lambda)=I_0(\lambda)a_1I_1(\lambda)+a_2I_2(\lambda) \quad \text{Equation (3)}$$

The term $I_i(\lambda)$ (i=0 to 2) in Equation (3) are the mean and basis vectors of the illumination illustrated in FIG. 6. Moreover coefficients $a_i$ (i=1 and 2) are weighting coefficients of respective basis vectors, and are characteristic parameters representing the color of the illumination. Here, when $I(\lambda)$ of Equation (3) is substituted into Equation (2), linear simultaneous equations with two unknown characteristic parameters $a_1$ and $a_2$, which represent the color of the illumination, are obtained. Therefore, the characteristic parameters $a_1$ and $a_2$ are easily calculated. Moreover, by substituting the characteristic parameters $a_1$ and $a_2$ obtained by solving the simultaneous equations into Equation (3), the illumination spectral distribution $I(\lambda)$ is obtained. The illumination spectral distribution obtained through the above-described procedure is used as the illumination spectral distribution $I(\lambda)$ when the input image was captured.

Next, a process of correcting colors of the specific object in an image while maintaining the texture will be described.

Now, a case where the specific object is the human face will be described as an example. In order to correct colors of the specific object in an image while maintaining the texture, it is necessary to extract and correct the original color information, that is, an albedo, of the specific object. In order to calculate the albedo of the specific object, it is necessary to remove the surface reflection component (shine) and the shading information from the apparent color information of the specific object. The surface reflection component and the shading information may require a 3-dimensional shape of the specific object and illumination geometrical information. In order to obtain a 3-dimensional shape of a specific object expressed as a 2-dimensional image, the technique disclosed in Non Patent Literature 3, for example, may be used. However, it is desirable to calculate the albedo of the specific object at a lower computation cost than the method disclosed in Non Patent Literature 3 or the like.

Figure 7:
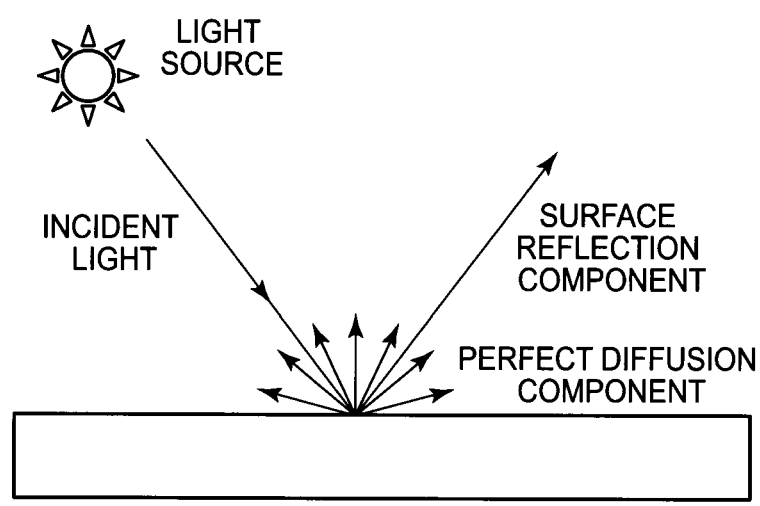
FIG. 7 It depicts an explanatory diagram illustrating an example of a dichroic reflection model.

Here, the apparent color information of an object perceived by a human is expressed as a dichroic reflection model depending on a quality condition (uncolored plastic) of the object. FIG. 7 is an explanatory diagram illustrating an example of a dichroic reflection model. In the example of FIG. 7, when incident light enters an object, a part of the light is diffused as a perfect diffusion component and another part thereof is reflected as a surface reflection component. In a dichroic reflection model such as a Phong model or a Torrance-Sparrow model, the reflection light from an object is represented as a mixture of two reflection components of a surface reflection component and a perfect diffusion component. The perfect diffusion component is determined by only the angle between a normal vector of an object surface and a light source directional vector. That is, the perfect diffusion component is not changed when viewed from any direction regardless of an observation direction.

On the other hand, the surface reflection component is the greatest at an angle at which the incidence angle is identical to the reflection angle. In other words, this means that the perfect diffusion component has a low frequency and the surface reflection component has a high frequency. If the surface reflection component (shine) of a specific object such as a face to which the dichroic reflection model itself cannot be applied can be identified, the surface reflection component can be said to have such features that the surface reflection component has a high-frequency component. Therefore, the present invention focuses on the fact that the surface reflection component (shine) of a specific object in an image such as a face, to which the dichroic reflection model itself cannot be applied, has a high-frequency component. Specifically, rather than using a 3-dimensional shape of the specific object, the surface reflection component (shine) and the shading information are removed from the apparent color information of the specific object to calculate the albedo. Thus, it is possible to calculate the albedo at a low computation cost. Specifically, the image information acquisition unit 110 and the reflection information reconstruction unit 120 execute these processes. Hereinafter, in the description of steps S3 and S4, these processes will be described in detail.

Subsequently, the reflection information reconstruction unit 120 calculates a low-frequency component of an area indicated by the specific object in the image (step S3). The reflection information reconstruction unit 120 may calculate the low-frequency component by calculating the mean value of the surrounding pixels of each pixel in the area indicated by the specific object in the image, for example. Moreover, the reflection information reconstruction unit 120 may calculate the low-frequency component using a smoothing filter that substitutes respective pixels into Gaussian values or the like. However, a method of calculating the low-frequency component is not limited to the above method.

Subsequently, the reflection information reconstruction unit 120 uses the low-frequency component calculated in step S3 as the perfect diffusion component of the specific object in the input image. Moreover, the reflection information reconstruction unit 120 subtracts the perfect diffusion component from the color information of the specific object in the input image to thereby calculate the surface reflection component (step S4).

In general, the reflectivity of an object depends on the geometrical conditions of incident light and emitted light, and this reflection characteristic is expressed as a BRDF (Bidirectional Reflectance Distribution Function). The BRDF is often composed of two components of a surface reflection component (Secular component) and a perfect diffusion component (Body reflection component). For example, when the specific object is a living creature such as a human, the surface reflection component is a component of light that is reflected on the skin surface. Moreover, in this case, the perfect diffusion component is a component of light that is generated when light temporarily enters inside the skin, and is scattered inside the skin and dispersed again through the skin.

The perfect diffusion component has low-frequency characteristics. Thus, the low-frequency component of an area indicated by the specific object can be regarded as the perfect diffusion component DR (Diffuse Reflection) of the specific object. In this example, it is assumed that the perfect diffusion component DR is calculated for each color channel (for example, R, G, B, or the like), and the perfect diffusion component of each color channel is expressed as DRi. Here, the character i represents each color channel.

Now, the perfect diffusion component is calculated, assuming that the specific object is Lambertian. However, the perfect diffusion component actually includes not only the diffuse reflection component but also a surface reflection component. That is, the pixel value of each color channel of the input image can be said to represent the apparent pixel value (luminance or brightness) of the color channel, including the diffuse reflection component and the surface reflection component. Thus, the reflection information reconstruction unit 120 calculates the surface reflection component SPi of each color channel of pixels included in an area indicated by the specific object by Equation (4) below.

$$\text{For } Ii-DRi>0, \; SPi=Ii-DRi$$

$$\text{Otherwise, } SPi=0 \quad \text{Equation (4)}$$

Here, "Ii" represents the pixel value of a pixel included in an area indicated by the specific object of the input image, and "i" represents a color channel (for example, R, G, B, or the like).

The luminance of the perfect diffusion component DRi is shading information (shading) of the object area. The shading information represents the luminance of the diffuse reflection component DRi of a certain pixel in the area indicated by the specific object of the input image and is calculated by Equation (1). If a tristimulus value Y (Y component of the tristimulus values) calculated by Equation (1) is the shading information caused by the 3-dimensional shape of the specific object and the geometrical condition of the illumination, the albedo can be defined as the color information in which the shading information is removed from the perfect diffusion component.

The albedo calculation unit 130 calculates an albedo of a pixel included in the area indicated by the specific object in the input image (step S5). Specifically, the albedo calculation unit 130 calculates the albedo of each color channel of a pixel included in the area indicated by the specific object in the input image according to Equation (5) below.

$$ADi = DRi/Y \qquad \text{Equation (5)}$$

Here, ADi represents the albedo of each color channel.

Subsequently, the albedo correction processing unit 140 (specifically, the albedo correction unit 142) reconstructs the surface reflectance R(λ) from the albedo of each pixel of the specific object in the input image and the illumination spectral distribution (step S6). Hereinafter, the input image will be described as an image in the RGB color system.

The albedo correction unit 142 calculates the tristimulus values XYZ based on the RGB values of the respective pixels in the specific object area, represented by the albedo ADi according to Equation (1). Moreover, the albedo correction unit 142 substitutes the calculated tristimulus values XYZ into the left side of Equation (2). Moreover, the albedo correction unit 142 substitutes the illumination spectral distribution I(λ) when the input image was captured, calculated in step S2 into the right side of Equation (2). By doing so, Equation (2) becomes an observation equation (hereinafter referred to as an observation equation (2)) of the surface reflectance R(λ) of a certain pixel of the specific object area.

The surface reflectance of the specific object is expressed by an infinite-dimensional waveform in the visible-ray range similar to the illumination spectral distribution. Thus, it is not possible to analytically calculate the surface reflectance of the specific object from the observation equation (2). Therefore, the albedo correction unit 142 models the surface reflectance of the specific object using a finite-dimensional linear model that is expressed by a weighted sum of low-dimensional basis vectors as in Equation (6) below.

[Formula 4]

$$R(\lambda) = r_0(\lambda) + b_1 r_1(\lambda) + b_2 r_2(\lambda) + b_3 r_3(\lambda) \qquad \text{Equation (6)}$$

Here, $r_i(\lambda)$ (i=0 to 3) is a basis vector obtained by collecting surface reflectances of a number of objects and analyzing the principal components of the surface reflectances. That is, $r_0(\lambda)$ is a mean vector, $r_1(\lambda)$ to $r_3(\lambda)$ are the first to third principal component vectors which are known vectors. On the other hand, $b_i$ (i=1 to 3) is a weighting coefficient of each basis vector and is an unknown characteristic parameter that represents an object color.

Figure 8:
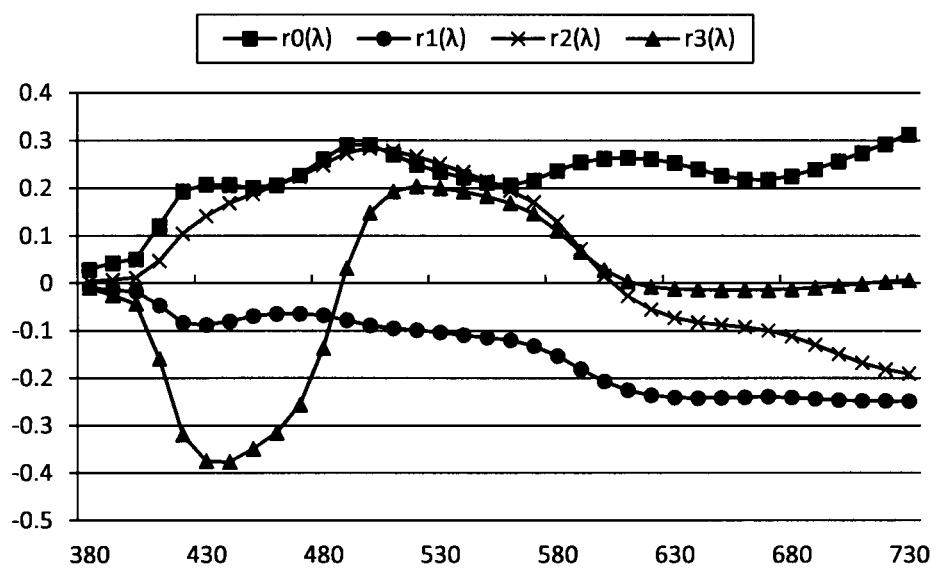
FIG. 8 It depicts a graph illustrating an example of basis vectors obtained by analyzing principal components of the surface reflectances of an object.

FIG. 8 is a graph illustrating an example of a basis vector that is obtained by analyzing a principal component of a surface reflectance of an object. The horizontal axis of the graph illustrated in FIG. 8 indicates a wavelength (nm) and the vertical axis indicates spectral distribution spectral power at each wavelength of illumination or a light source. Moreover, a basis vector that is obtained by collecting a number of surface reflectances of specific objects and analyzing the principal components of the surface reflectances may also be used in Equation (6).

Now, it is assumed that the surface reflectance R(λ) of the specific object is expressed as Equation (6). In this case, the unknown characteristic parameters $b_1$ to $b_3$ are obtained by linear simultaneous equations (Equation (7) below) with three unknowns obtained by substituting Equation (6) into the observation equation (2).

[Formula 5]

$$\begin{pmatrix} b_1 \\ b_2 \\ b_3 \end{pmatrix} = \begin{pmatrix} M(x, r_1) & M(x, r_2) & M(x, r_3) \\ M(y, r_1) & M(y, r_2) & M(y, r_3) \\ M(z, r_1) & M(z, r_2) & M(z, r_3) \end{pmatrix}^{-1} \begin{pmatrix} X - M(x, r_0) \\ Y - M(y, r_0) \\ Z - M(z, r_0) \end{pmatrix} \qquad \text{Equation (7)}$$

Here, $M(x, r_i)$ (i=0 to 3) represents an integration term below. This also holds true for y and z.

$$\int I(\lambda) r_i(\lambda) x(\lambda) d\lambda \qquad \text{[Formula 6]}$$

Moreover, the albedo correction unit 142 substitutes the characteristic parameters $b_i$ (i=1 to 3) obtained by Equation (7) into Equation (6). By doing so, the surface reflectance in an optional pixel of the object area is obtained.

Subsequently, the albedo correction unit 142 calculates the reproduced surface reflectance of each pixel of the object in the input image using the reference surface reflectance of the object area and calculates a corrected albedo (step S7). First, the albedo correction unit 142 corrects the surface reflectance of each pixel of the object in the input image, calculated in step S6 based on the reference surface reflectance that is set so that a desired color of the object area can be reproduced. The reference surface reflectance of the object area is a surface reflectance that is set in advance so that a desired color of the object area can be reproduced. More specifically, the reference surface reflectance is such a surface reflectance that the object has a satisfactory and desirable color (lightness, saturation, and hue) in a color image that is obtained by shooting that object under the standard illumination. That is, the reference surface reflectance can be said to be a surface reflectance when the color information of the object area is reproduced in a desired color.

Since the reference surface reflectance depends on the subjective view of a person, it cannot be uniquely defined. However, the reference surface reflectance can be obtained in advance by conducting a subjective evaluation test. For example, the image quality of an object area is evaluated by changing the color of the object area in an image to various colors using an image processing tool. Then, the processes of steps S2 and S3 are applied to the image that is determined to be the most desirable among the evaluated images. In this way, it is possible to obtain the reference surface reflectance of each pixel in the object area.

Moreover, as for the reference surface reflectance, three or more colors are selected in advance from the object area. Moreover, the surface reflectance of the pixel color corresponding to the mean color, the median color (median), or the mode color (mode) of the selected colors may be defined as the reference surface reflectance of the object area. In addition to the above, the surface reflectance of the brightest color, the darkest color, a color having the highest saturation, and a color having the lowest saturation within the object area may be defined as the reference surface reflectance of the object area. Alternatively, the color distribution within the object area may be analyzed to find colors located at both ends of the hue, and the surface reflectance of the colors may be defined as the reference surface reflectance of the object area. Hereinafter, the reference surface reflectance is sometimes referred to as Rref($\lambda$).

Further, when shape features of an object in an input image can be used, the surface reflectance of a color in that area may be defined as the reference surface reflectance Rref($\lambda$) of that object area. For example, when the object is a face, a cheek, a corner of an eye, a forehead, and the like can be used as the feature area. In this case, the mean color of pixels located within a certain range of these feature areas may be obtained and the surface reflectance of that mean color may be calculated. The calculated surface reflectance may be defined as the reference surface reflectance Rref($\lambda$) of that object area.

By using the above-described method, it is possible to determine the reference surface reflectance of the object area in advance. However, the method of calculating the reference surface reflectance is not limited to the above method.

The albedo correction unit 142 calculates the reproduced surface reflectance Rmd($\lambda$) by correcting the surface reflectance R($\lambda$) of each pixel of the specific object in the input image using the reference surface reflectance Rref($\lambda$). That is, the albedo correction unit 142 calculates the reproduced surface reflectance Rmd($\lambda$) for reproducing a desired color using the reference surface reflectance Rref($\lambda$) for reproducing the color of the object area satisfactorily.

The albedo correction unit 142 calculates the reproduced surface reflectance Rmd($\lambda$) using Equation (8) below, for example.

$$Rmd(\lambda) = \alpha \cdot R(\lambda) + (1-\alpha) \cdot Rref(\lambda) \quad \text{Equation (8)}$$

Here, $\alpha$ is a real number of 0 or more and 1.0 or less ($0 \leq \alpha \leq 1.0$).

Moreover, the albedo correction unit 142 may calculate the reproduced surface reflectance Rmd($\lambda$) as follows. First, the albedo correction unit 142 obtains the surface reflectance of a pixel color corresponding to the mean color, the median color (median), or the mode color (mode) of the colors in the specific object in the input image. The surface reflectance is defined as Ravg($\lambda$). As for the reference surface reflectance, the above-described Rref($\lambda$) is used. Here, a function F($\lambda$) of wavelength $\lambda$ is defined as Equation (9) below.

$$F(\lambda) = Rref(\lambda)/Rang(\lambda) \quad \text{Equation (9)}$$

Moreover, the albedo correction unit 142 calculates the reproduced surface reflectance Rmd($\lambda$) by correcting the surface reflectance R($\lambda$) of each pixel of the specific object in the input image using Equation (10) below.

$$Rmd(\lambda) = \alpha \cdot F(\lambda) \cdot R(\lambda) + (1-\alpha) \cdot R(\lambda) \quad \text{Equation (10)}$$

Here, $\alpha$ is a real number of 0 or more and 1.0 or less ($0 \leq \alpha \leq 1.0$).

In this way, the albedo correction unit 142 corrects the surface reflectance of the object area to a surface reflectance (that is, a reproduced surface reflectance) using the function F($\lambda$) of one wavelength $\lambda$. Further, the albedo correction unit 142 may calculate the reproduced surface reflectance by preventing the dispersion of the reproduced color in the object area from being narrowed. This is because if the dispersion of the colors within the object area becomes narrower, it could cause the deterioration of the texture.

In the present exemplary embodiment, when correcting the color of the object area in an image, the albedo correction unit 142 corrects the characteristic parameters $b_i$ (i=1 to 3) that constitute the surface reflectance calculated from the albedo with respect to each pixel in the area indicated by the specific object. The subsequent process of step S7 will be referred to as a reproduced surface reflectance extension deriving process.

That is, the surface reflectance calculated from the albedo can be expressed by a weighted sum of low-dimensional basis vectors as illustrated in Equation (6). In Equation (6), $r_0(\lambda)$ to $r_3(\lambda)$ are fixed vectors, and the surface reflectance changes (that is, the color changes) when the characteristic parameter $b_i$ changes. Thus, when the characteristic parameter $b_i$ is corrected, the surface reflectance R($\lambda$) calculated from the albedo is also corrected. As a result, it is possible to obtain the reproduced surface reflectance Rmd($\lambda$).

An example of an expression for correcting the characteristic parameter $b_i$ (i=1 to 3) is illustrated in Equation (11) below.

[Formula 7]

$$\begin{pmatrix} b'_1 \\ b'_2 \\ b'_3 \end{pmatrix} = \begin{pmatrix} m_{11} & m_{12} & m_{13} \\ m_{21} & m_{22} & m_{23} \\ m_{31} & m_{32} & m_{33} \end{pmatrix} \begin{pmatrix} b_1 \\ b_2 \\ b_3 \end{pmatrix} \quad \text{Equation (11)}$$

Here, $b_i'$ (i=1 to 3) is a corrected characteristic parameter. Moreover, the 3×3 matrix in Equation (11) is a correction matrix. The albedo correction unit 142 calculates elements $m_{ij}$ (i=1 to 3, j=1 to 3) of the correction matrix in the following manner.

As described above, first, three or more reference surface reflectances Rref(i,$\lambda$) (i=0 to n, where n≥3) are prepared in advance for the specific object. The reference surface reflectance Rref(i, $\lambda$) may be the surface reflectance of a pixel color corresponding to the mean color, the median color (median), and the mode color (mode) of the color of the specific object area. Moreover, the reference surface reflectance Rref(i,$\lambda$) may be the surface reflectance of the brightest color, the darkest color, a color having the highest saturation, or a color having the lowest saturation within the object area, or may be the surface reflectance of a color that is located at either end of the hue when the color distribution within the object area is analyzed. Further, if the shape features of an object in the input image can be used, the reference surface reflectance Rref(i,$\lambda$) may be the surface reflectance of the color of the area.

The albedo correction unit 142 obtains colors having the same properties in the object area in the input image with respect to each of the reference surface reflectances Rref(i, $\lambda$) and obtains the surface reflectances of these colors. That is, when the first reference surface reflectance Rref(1, $\lambda$) is the surface reflectance that is determined to be the most desirable for the mean color of the object area in the image, the albedo correction unit 142 obtains the surface reflectance R(1, $\lambda$) for the mean color of the object area. Here, the characteristic parameter of Rref(1, $\lambda$) is represented as $b_{r1,i}$ (i=1 to 3), and the characteristic parameter of R(1, $\lambda$) is represented as $b_{1,i}$ (i=1 to 3).

The albedo correction unit 142 corrects the mean color of the object area in the input image to the central color of the object area when it is determined to be desirable. Specifically, the albedo correction unit 142 substitutes $b_{r1,i}$ (i=1 to 3) which is the characteristic parameter of Rref(1, $\lambda$) into the characteristic parameter $b_i'$ (i=1 to 3) on the left side of Equation (11). Moreover, the albedo correction unit 142 substitutes $b_{1,i}$ (i=1 to 3) which is the characteristic parameter of R(i,$\lambda$) into the characteristic parameter $b_i$ (i=1 to 3) on the right side of Equation (11). As a result, Equation (11) becomes simultaneous equations of unknown elements $m_{ij}$ (i=1 to 3, j=1 to 3).

By performing a similar process for each of the three or more colors of the object, the unknown elements $m_{ij}$ (i, j=1 to 3) can be solved based on the relation between the number of equations and the number of unknowns. Thus, a correction matrix of Equation (11) can be derived.

Figure 9:
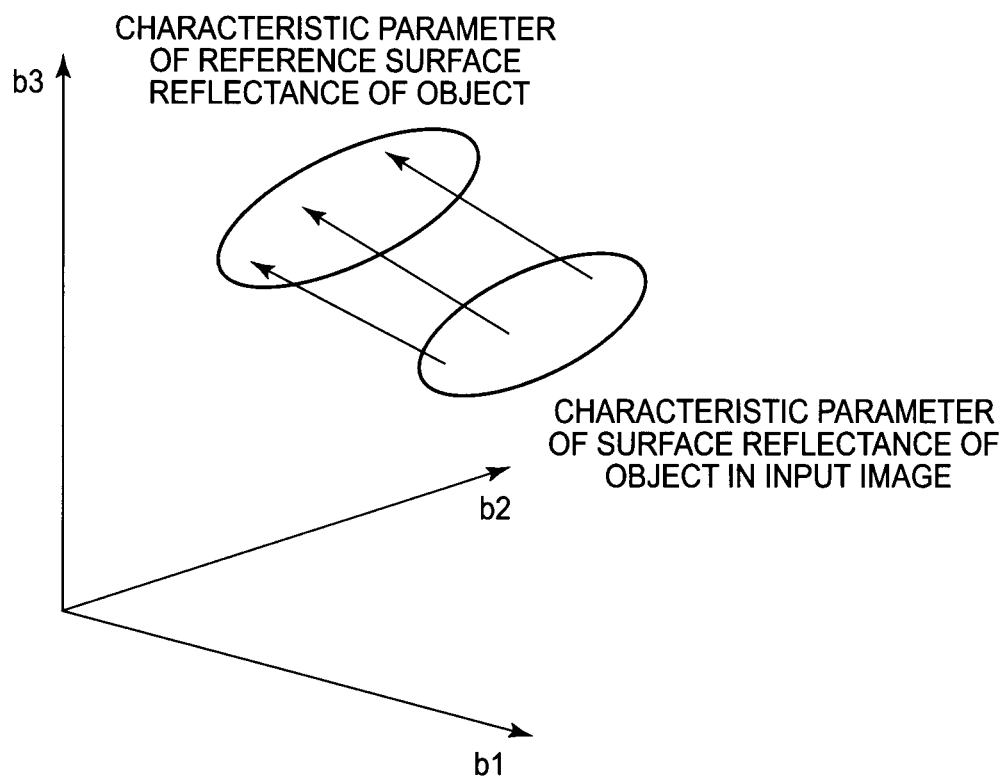
FIG. 9 It depicts an explanatory diagram illustrating an example of correction performed in a characteristic parameter space relating to the color of an object area.

FIG. 9 is an explanatory diagram illustrating an example of the relation when the characteristic parameter is corrected for three colors of the object area in the space of the characteristic parameter $b_i$ (i=1 to 3). In the example of FIG. 9, the characteristic parameter of the surface reflectance of the object in the input image is corrected as the characteristic parameter of the reference surface reflectance of the object. As illustrated in FIG. 9, the distribution of the characteristic parameter in the specific object area in the input image is corrected to the distribution of the characteristic parameter in the reference surface reflectance which results in desirable color reproduction. Thus, it is possible to suppress a change (for example, deflection of the dispersion and a decrease of the dispersion) of the dispersion of color and to suppress the texture of a corrected color from being impaired.

Further, conversely, when the distribution of the characteristic parameters of the specific object area in the input image is dispersed greatly, the distribution can be corrected and adjusted to the dispersion of the distribution of the characteristic parameters in the reference surface reflectance. Therefore, the deterioration of the texture caused by an excessively great dispersion of color can be improved.

The albedo correction unit 142 applies the correction matrix of Equation (11) to the characteristic parameters $b_i$ (i=1 to 3) that constitute the surface reflectance of each pixel of the object in the input image to thereby calculate a corrected characteristic parameter. Moreover, the albedo correction unit 142 substitutes the calculated corrected parameters into Equation (6) to thereby calculate a corrected reproduced surface reflectance of each pixel of the object in the input image.

Subsequently, the albedo correction unit 142 calculates a corrected color of each pixel of the object in the input image. Specifically, the albedo correction unit 142 substitutes the illumination spectral distribution and the reproduced surface reflectance into the right side of Equation (2) to calculate the tristimulus values X'Y'Z', that is, a corrected albedo ADi' ("i" represents a color channel). When the color system is the RGB color system, the albedo correction unit 142 calculates the corrected albedo ADi' using Equation (12) below.

[Formula 8]

$$ADi' = \begin{pmatrix} R' \\ G' \\ B' \end{pmatrix} = XR \begin{pmatrix} X' \\ Y' \\ Z' \end{pmatrix} \quad \text{Equation (12)}$$

Here, XR is the inverse matrix of the matrix RX illustrated in Equation (1), and is a matrix that takes a known value.

Subsequently, the reproduced color calculation unit 150 calculates a corrected color of each pixel of the object in the input image using the corrected albedo, the shading information (that is, the luminance of the diffuse reflection component), and the surface reflection component (step S8). The corrected color can be also referred to as a reproduced color.

First, the reproduced color calculation unit 150 multiplies the corrected albedo ADi' by the luminance of the diffuse reflection component, that is, the shading information to calculate the perfect diffusion component DRi' as illustrated in Equation (13).

$$DRi' = ADi' \times Y \quad \text{Equation (13)}$$

Here, Y is the luminance of the perfect diffusion component DRi, that is, the Y component of the tristimulus values obtained by Equation (1). Moreover, the reproduced color calculation unit 150 adds the surface reflection component SPi to the perfect diffusion component DRi' to obtain the color corrected pixel value Ii' as illustrated in Equation (14).

$$Ii' = DRi' + Spi \quad \text{Equation (14)}$$

Moreover, the reproduced color calculation unit 150 outputs an image in which the color of the object area in the input image is corrected according to the above method as an output image.

In the above description, a case where the device-dependent colors of the input and output images are RGB has been described. The "device-dependent colors" mean a color space that depends on an output destination device. However, the device-dependent colors are not limited to RGB. The device-dependent colors may be CMY and CMYK other than RGB as long as the corresponding relation between those device-dependent colors and the tristimulus values XYZ of device-independent colors can be obtained. In this case, the color correction method of the present invention can be applied to images of colors other than RGB.

Moreover, a case where the process of reconstructing the illumination spectral distribution (illumination color information) is performed in step S2 illustrated in FIG. 3 has been described. However, this process may not necessarily be performed in the order illustrated in FIG. 3. This process may be performed earlier than the process (that is, the surface reflectance calculation process) of step S6 illustrated in FIG. 3.

As described above, according to the present exemplary embodiment, the image information acquisition unit 110 detects an object area from an input image. Subsequently, the reflection information reconstruction unit 120 calculates the color information and the perfect diffusion component of the object area and reconstructs the surface reflection component based on the color information and the low-frequency component. Moreover, the albedo calculation unit 130 calculates an albedo in which the shading information is removed from the perfect diffusion component. After that, the albedo correction processing unit 140 (specifically the spectral distribution reconstruction unit 141 and the albedo correction unit 142) reconstructs the surface reflectance of the object area based on the color information and the albedo of the object area and calculates the corrected albedo based on the surface reflectance. Moreover, the reproduced color calculation unit 150 adds the shading information and the surface reflection component to the corrected albedo to calculate the reproduced color and generates an output image based on the reproduced color. By performing such a process, it is possible to reproduce a predetermined object in a color image captured by a color imaging device in a desired color at a low computation cost and to improve the texture.

Figure 10:
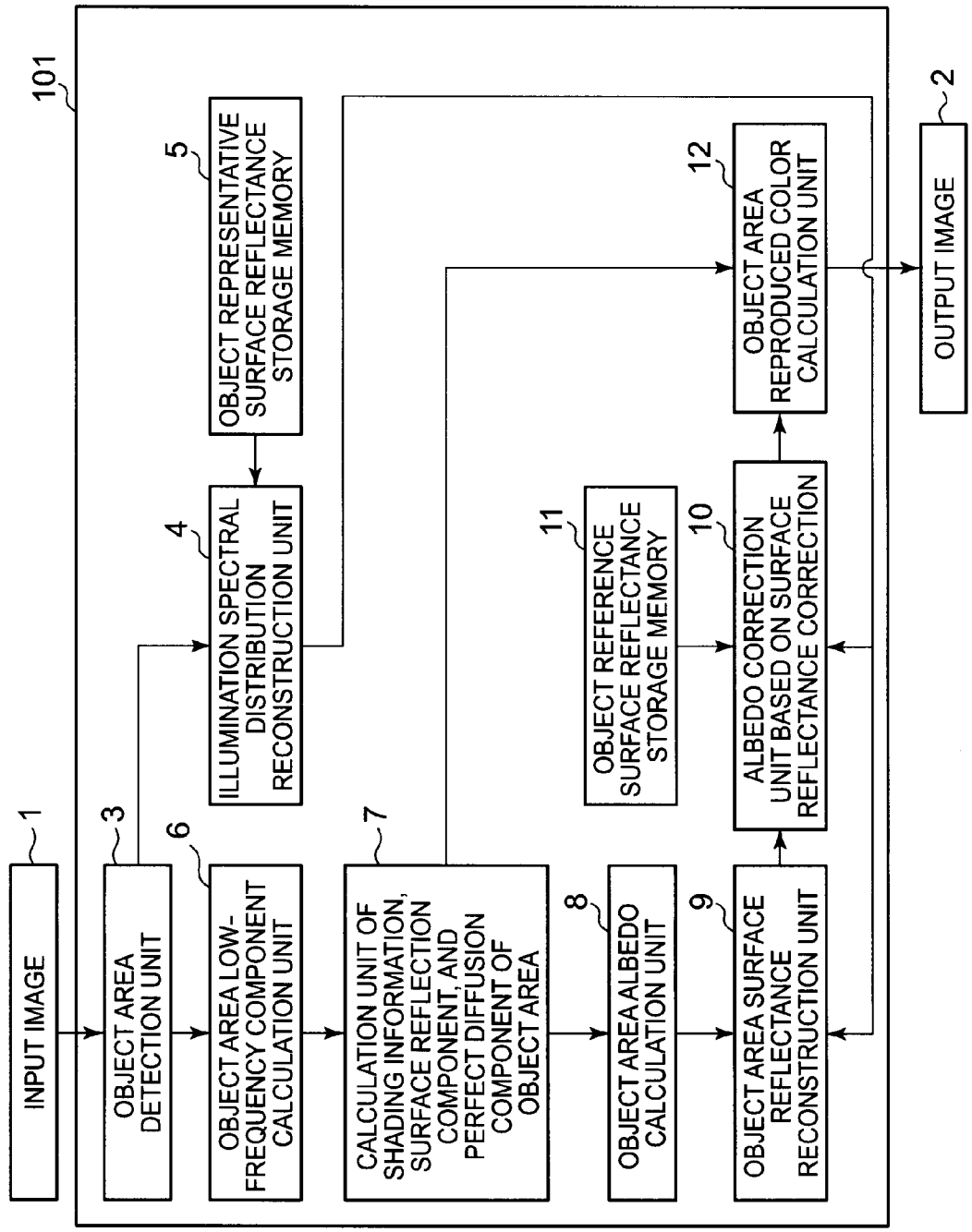
FIG. 10 It depicts a block diagram illustrating an example of a color image processing device applied to the color image processing method according to the first exemplary embodiment.

Next, a modification example of the color image processing device (also referred to as a color correction device) will be described. FIG. 10 is a block diagram illustrating an example of a color image processing device that is applied to the color image processing method according to the first exemplary embodiment.

A color image processing device 101 illustrated in FIG. 10 is a device that performs color correction on an input image 1 and outputs an output image 2. The color image processing device 101 includes an object area detection unit 3, an illumination spectral distribution reconstruction unit 4 (hereinafter a spectral distribution reconstruction unit 4), an object representative surface reflectance storage memory 5 (hereinafter representative surface reflectance storage memory 5), an object area low-frequency component calculation unit 6 (hereinafter a low-frequency component calculation unit 6), a unit 7 (hereinafter a reflection information reconstruction unit 7) that calculates shading information, a surface reflection component, and a perfect diffusion component of the object area, an object area albedo calculation unit 8 (hereinafter an albedo calculation unit 8), an object area surface reflectance reconstruction unit 9 (hereinafter a surface reflectance reconstruction unit 9), an albedo correction unit 10 (hereinafter a corrected albedo calculation unit 10) based on surface reflectance correction, an object reference surface reflectance storage memory 11 (hereinafter a reference surface reflectance storage memory 11), and an object area reproduced color calculation unit 12 (hereinafter a reproduced color calculation unit 12).

When an input image 1 is supplied, the object area detection unit 3 analyzes the input image 1 to detect a specific object that is assumed in advance. Moreover, the object area detection unit 3 outputs information that represents an object area in the detected specific object. Here, the information that represents the object area includes the color information of the object area. Specifically, the object area detection unit 3 obtains the color information of the object area using the method that the image information acquisition unit 110 performs as described in step S1 of FIG. 3.

Moreover, as described above, the specific object detected from the input image 1 is such an object that the color and the shape features of the object area can be limited to some extent like a human face. Further, the method of detecting the specific object is as described in the description of the image information acquisition unit 110. Further, when it is not possible to detect a target object from the input image 1, the reproduced color calculation unit 12 described later outputs the input image 1 as an output image 2.

The representative surface reflectance storage memory 5 stores the representative surface reflectance of the object area. A preset value is stored as the representative surface reflectance of the object area.

The spectral distribution reconstruction unit 4 reconstructs the illumination spectral distribution. Specifically, the spectral distribution reconstruction unit 4 reconstructs the illumination spectral distribution in the input image using the color information of the object area and the representative surface reflectance of the object area. Further, the object area is an area indicated by the specific object that is detected by the object area detection unit 3. The spectral distribution reconstruction unit 4 reconstructs the illumination spectral distribution (illumination color information) of the object area using the method that the spectral distribution reconstruction unit 141 performs as described in step S2 of FIG. 3.

In the color image processing device 101 illustrated in FIG. 10, the spectral distribution reconstruction unit 4 reads a representative surface reflectance of the object area from the representative surface reflectance storage memory 5. Moreover, the spectral distribution reconstruction unit 4 reconstructs the illumination spectral distribution according to the process described in step S2 using the color information of the object area and the representative surface reflectance of the object area.

The low-frequency component calculation unit 6 calculates the low-frequency component of the object area. Specifically, the low-frequency component calculation unit 6 calculates the low-frequency component of the object area detected by the object area detection unit 3 based on the process that the reflection information reconstruction unit 120 performs as described in step S3.

The reflection information reconstruction unit 7 calculates the shading information, the surface reflection component, and the perfect diffusion component of the object area. Specifically, the reflection information reconstruction unit 7 obtains the surface reflection component and the perfect diffusion component of the object area using the low-frequency component of the object area according to the process that the reflection information reconstruction unit 120 performs as described in step S4 and also obtains the shading information of the object area.

The albedo calculation unit 8 calculates the albedo of the object area. Specifically, the albedo calculation unit 8 calculates the albedo which is the color information in which the luminance, that is, the shading information, is removed from the perfect diffusion component obtained by the reflection information reconstruction unit 7. Further, the process of the reflection information reconstruction unit 7 to calculate the albedo is performed according to the flow of the process that the albedo calculation unit 130 performs as described in step S5.

The surface reflectance reconstruction unit 9 reconstructs the surface reflectance of the object area. Specifically, the surface reflectance reconstruction unit 9 reconstructs the surface reflectance of each pixel of the object area from the reconstructed illumination spectral distribution and the albedo of the object area. The surface reflectance reconstruction unit 9 reconstructs the surface reflectance according to the flow of the process that the albedo correction unit 142 performs as described in step S6.

The reference surface reflectance storage memory 11 stores the reference surface reflectance of the object area. The reference surface reflectance storage memory 11 is a memory that can store the reference surface reflectances of three or more object areas.

The corrected albedo calculation unit 10 corrects the surface reflectance to correct the albedo. Specifically, the corrected albedo calculation unit 10 corrects the surface reflectance reconstructed by the surface reflectance reconstruction unit 9 using the reference surface reflectance of the object area stored in the reference surface reflectance storage memory 11. Subsequently, the corrected albedo calculation unit 10 calculates the reproduced surface reflectance based on the corrected surface reflectance. Moreover, the corrected albedo calculation unit 10 calculates an albedo after correction (corrected albedo) from the illumination spectral distribution and the reproduced surface reflectance. The corrected albedo calculation unit 10 performs the process according to the flow of the process that the albedo correction unit 142 performs as described in step S7.

Further, the corrected albedo calculation unit 10 may calculate the reproduced surface reflectance using a plurality of reference surface reflectances. In this case, the corrected albedo calculation unit 10 calculates the reproduced surface reflectance according to the flow of the process (more specifically, the reproduced surface reflectance extension deriving process) that the albedo correction unit 142 performs as described in the second half of step S7.

The reproduced color calculation unit 12 calculates the reproduced color of the object area. Specifically, the reproduced color calculation unit 12 calculates a corrected color of each pixel of the object in the input image using the corrected albedo of each pixel of the object area, the luminance (that is, the shading information) of the perfect diffusion component, and the surface reflection component. Moreover, the reproduced color calculation unit 12 outputs the calculated corrected image as an output image. Further, the reproduced color calculation unit 12 calculates the corrected color and outputs the corrected image according to the flow of the process that the reproduced color calculation unit 150 performs as described in step S8.

From the above, the color image processing device 101 illustrated in FIG. 10 and the color image processing device 100 illustrated in FIG. 2 have the following correspondence. The image information acquisition unit 110 corresponds to the object area detection unit 3. The reflection information reconstruction unit 120 is realized by the low-frequency component calculation unit 6 and the reflection information reconstruction unit 7. The albedo calculation unit 130 corresponds to the albedo calculation unit 8. The spectral distribution reconstruction unit 141 of the albedo correction processing unit 140 is realized by the spectral distribution reconstruction unit 4 and the representative surface reflectance storage memory 5. Moreover, the albedo correction unit 142 is realized by the surface reflectance reconstruction unit 9, the corrected albedo calculation unit 10, and the reference surface reflectance storage memory 11. The reproduced color calculation unit 150 corresponds to the reproduced color calculation unit 12. The configuration of the color image processing device illustrated in FIG. 2 or FIG. 9 is merely an example, and other device configurations may be used as long as the device can realize the same functions.

Further, the color image processing device 101 can be realized by a computer. Specifically, the respective constituent components that constitute the color image processing device, that is, the object area detection unit 3, the spectral distribution reconstruction unit 4, the low-frequency component calculation unit 6, the reflection information reconstruction unit 7, the albedo calculation unit 8, the surface reflectance reconstruction unit 9, the corrected albedo calculation unit 10, and the reproduced color calculation unit 12 are realized by a central processing unit (CPU) of a computer that operates according to a program (color image processing program). Moreover, the representative surface reflectance storage memory 5 and the reference surface reflectance storage memory 11 are realized by a memory device included in the color image processing device 101, for example.

For example, the program may be stored in a storage unit (not illustrated) of the color image processing device 101, and the CPU may read the program and operate as the object area detection unit 3, the spectral distribution reconstruction unit 4, the low-frequency component calculation unit 6, the reflection information reconstruction unit 7, the albedo calculation unit 8, the surface reflectance reconstruction unit 9, the corrected albedo calculation unit 10, and the reproduced color calculation unit 12 according to the program.

Moreover, the object area detection unit 3, the spectral distribution reconstruction unit 4, the low-frequency component calculation unit 6, the reflection information reconstruction unit 7, the albedo calculation unit 8, the surface reflectance reconstruction unit 9, the corrected albedo calculation unit 10, and the reproduced color calculation unit 12 may be realized by dedicated hardware, respectively.

Further, the statement that the respective constituent components constituting the color image processing device can be realized by a CPU and a memory and can operate according to a program is also applicable to a second exemplary embodiment described later without being limited to the first exemplary embodiment.

Second Exemplary Embodiment

Figure 11:
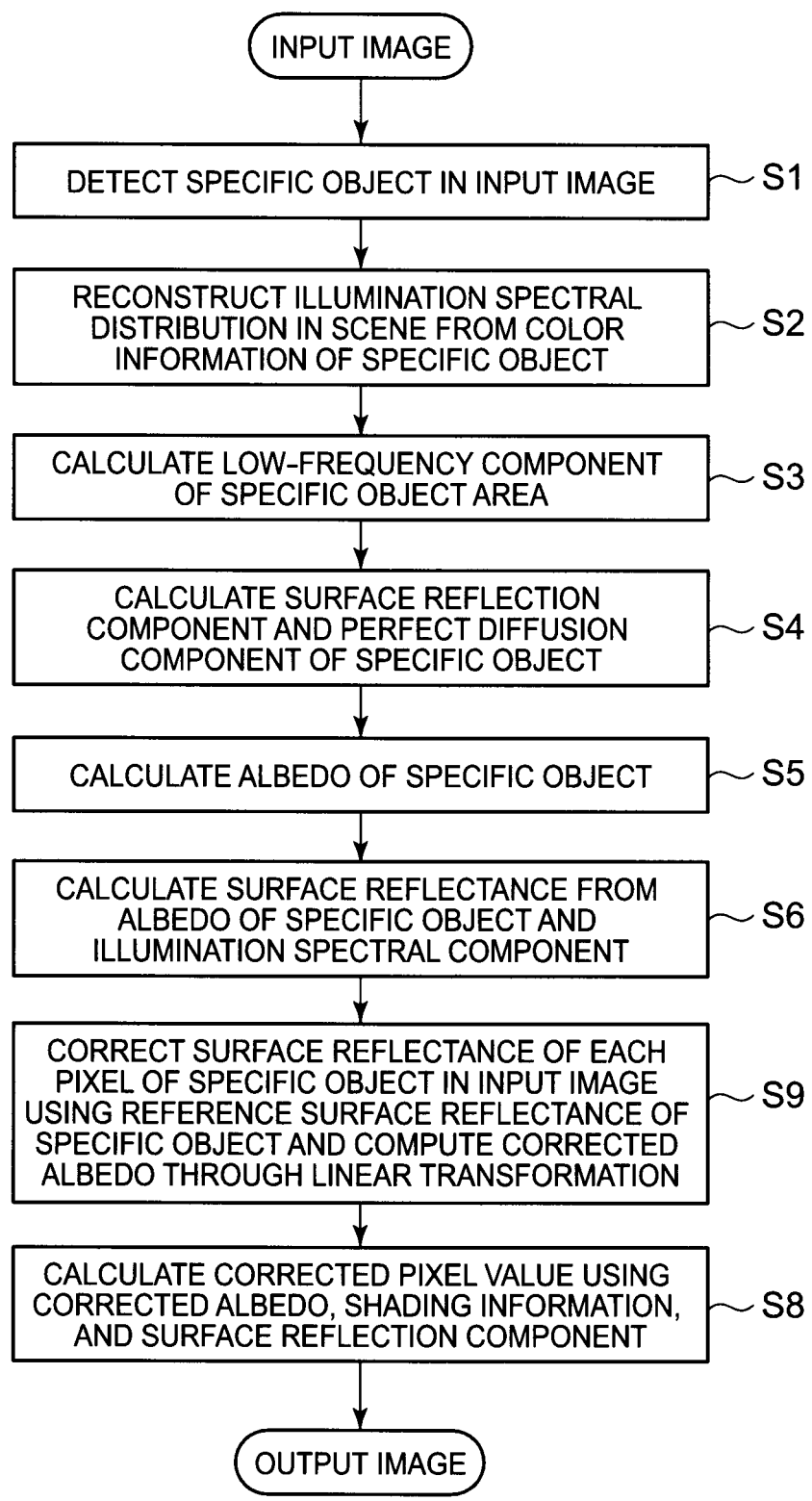
FIG. 11 It depicts a flowchart illustrating an example of a color image processing method according to a second exemplary embodiment of the present invention.

Subsequently, the flow of the processes of a color image processing method according to a second exemplary embodiment of the present invention will be described with reference to drawings. FIG. 11 is a flowchart illustrating an example of the color image processing method according to the second exemplary embodiment of the present invention. It is also assumed that the color image processing method according to the second exemplary embodiment is realized using the color image processing device 100 illustrated in FIG. 2.

The color image processing method according to the second exemplary embodiment is different from the color image processing method according to the first exemplary embodiment in that the two processes (specifically, the surface reflectance reconstruction process and the corrected albedo calculation process) performed in steps S6 and S7 in FIG. 3 are combined into one process. The other processes are the same as those of the first exemplary embodiment.

Specifically, the albedo correction unit 142 illustrated in FIG. 2 performs a process (specifically, step S9 in FIG. 10) in which the process (step S6) of reconstructing the surface reflectance of each pixel of the object in an input image and the process (step S7) of correcting the reconstructed surface reflectance to calculate a corrected albedo are combined. That is, in step S9, a computation formula (correction formula) is created such that the computation result of the corrected reproduced color performed in step S8 of FIG. 11 is the same as the computation result calculated in step S8 of the first exemplary embodiment. Hereinafter, a method of the albedo correction unit 142 to create a correction formula based on linear computation in step S9 will be described. The use of the color image processing method that uses such a correction formula enables the correction result equivalent to that of the color image processing method according to the first exemplary embodiment to be realized at a low computation cost.

Further, the processes of steps S1 to S5 in FIG. 11, of detecting the specific object from an input image to calculate the albedo of the specific object and the process of step S8 in FIG. 11, of calculating a corrected pixel value are the same as the processes of steps S1 to S5 and step S8 illustrated in FIG. 3, and redundant description thereof will not be provided.

After the albedo calculation unit 130 calculates the albedo of the specific object, the albedo correction unit 142 corrects the surface reflectance of each pixel of the specific object in the input image using the reference surface reflectance of the specific object. Moreover, the albedo correction unit 142 calculates the corrected albedo by linear transformation (step S9). Specifically, first, the albedo correction unit 142 calculates a 3×3 matrix (that is, a correction matrix of the surface reflectance of the object area) that is made up of the elements $m_{ij}$ (i=1 to 3, j=1 to 3) by Equation (11) described above using the method of calculating the surface reflectance of the object area described in step S6.

Now, in step S2, it is assumed that the spectral distribution reconstruction unit 141 reconstructs the illumination spectral distribution $I(\lambda)$ when the input image was captured. Moreover, it is assumed that the albedo correction unit 142 performs the same process as step S6 of FIG. 3 and reconstructs the surface reflectance $R(\lambda)$ of a certain pixel of the object area in the input image. That is, in this example, it is assumed that it is in a state where the characteristic parameter $b_i$ (i=1 to 3) that represents the object color is already obtained. In this state, the albedo correction unit 142 derives the 3×3 correction matrix for correcting the surface reflectance by the same process as step S7 described above.

After deriving the correction matrix, the albedo correction unit 142 calculates the characteristic parameter $b_i'$ (i=1 to 3) of $R'(\lambda)$ using Equation (11). Here, $R'(\lambda)$ is a corrected surface reflectance of the object area. Moreover, the albedo correction unit 142 calculates the corrected surface reflectance R'(λ) by substituting the characteristic parameter $b_i'$ (i=1 to 3) into Equation (6). In this case, the corrected surface reflectance R'(λ) is expressed as the following Equation (15).

[Formula 9]

$$R'(\lambda)=r_0(\lambda)+b_1'r_1(\lambda)+b_2'r_2(\lambda)+b_3'r_3(\lambda) \quad \text{Equation (15)}$$

Moreover, the corrected tristimulus values X'Y'Z' of the color of the object area are expressed as the following Equation (16).

[Formula 10]

$$X'=\int I(\lambda)R'(\lambda)x(\lambda)d\lambda$$

$$Y'=\int I(\lambda)R'(\lambda)y(\lambda)d\lambda$$

$$Z'=\int I(\lambda)R'(\lambda)z(\lambda)d\lambda \quad \text{Equation (16)}$$

Further, when Equation (15) is substituted into the right side of Equation (16) and expressed in the form of matrix transformation, the following Equation (17) is obtained.

[Formula 11]

$$\begin{pmatrix} X' \\ Y' \\ Z' \end{pmatrix} = \begin{pmatrix} M(x,r_1) & M(x,r_2) & M(x,r_3) \\ M(y,r_1) & M(y,r_2) & M(y,r_3) \\ M(z,r_1) & M(z,r_2) & M(z,r_3) \end{pmatrix} \begin{pmatrix} b_1' \\ b_2' \\ b_3' \end{pmatrix} + \begin{pmatrix} M(x,r_0) \\ M(y,r_0) \\ M(z,r_0) \end{pmatrix} \quad \text{Equation (17)}$$

Here, $M(x,r_i)$ (i=0 to 3) represents an integration term described below. This also holds true for y and z.

$$\int I(\lambda)r_i(\lambda)x(\lambda)d\lambda \quad \text{[Formula 12]}$$

Moreover, Equation (17) is expressed as the following Equation (18) from Equations (7) and (11).

[Formula 13]

$$\begin{pmatrix} X' \\ Y' \\ Z' \end{pmatrix} = \begin{pmatrix} M(x,r_1) & M(x,r_2) & M(x,r_3) \\ M(y,r_1) & M(y,r_2) & M(y,r_3) \\ M(z,r_1) & M(z,r_2) & M(z,r_3) \end{pmatrix} \quad \text{Equation (18)}$$

$$\begin{pmatrix} m_{11} & m_{12} & m_{13} \\ m_{21} & m_{22} & m_{23} \\ m_{31} & m_{32} & m_{33} \end{pmatrix} \begin{pmatrix} M(x,r_1) & M(x,r_2) & M(x,r_3) \\ M(y,r_1) & M(y,r_2) & M(y,r_3) \\ M(z,r_1) & M(z,r_2) & M(z,r_3) \end{pmatrix}^{-1}$$

$$\begin{pmatrix} X - M(x,r_0) \\ Y - M(y,r_0) \\ Z - M(z,r_0) \end{pmatrix} + \begin{pmatrix} M(x,r_0) \\ M(y,r_0) \\ M(z,r_0) \end{pmatrix}$$

Further, Equation (18) can be rearranged as the following Equation (19).

[Formula 14]

$$\begin{pmatrix} X' \\ Y' \\ Z' \end{pmatrix} = O\begin{pmatrix} X \\ Y \\ Z \end{pmatrix} + P \quad \text{Equation (19)}$$

Here, the matrix O is a 3×3 matrix represented by the following Equation (20), and the matrix P is a 3×1 matrix represented by the following Equation (21). Any of the matrixes is a constant matrix.

[Formula 15]

$$O = \begin{pmatrix} M(x,r_1) & M(x,r_2) & M(x,r_3) \\ M(y,r_1) & M(y,r_2) & M(y,r_3) \\ M(z,r_1) & M(z,r_2) & M(z,r_3) \end{pmatrix} \quad \text{Equation (20)}$$

$$\begin{pmatrix} m_{11} & m_{12} & m_{13} \\ m_{21} & m_{22} & m_{23} \\ m_{31} & m_{32} & m_{33} \end{pmatrix} \begin{pmatrix} M(x,r_1) & M(x,r_2) & M(x,r_3) \\ M(y,r_1) & M(y,r_2) & M(y,r_3) \\ M(z,r_1) & M(z,r_2) & M(z,r_3) \end{pmatrix}^{-1}$$

$$P = \begin{pmatrix} M(x,r_0) \\ M(y,r_0) \\ M(z,r_0) \end{pmatrix} - O\begin{pmatrix} M(x,r_0) \\ M(y,r_0) \\ M(z,r_0) \end{pmatrix} \quad \text{Equation (21)}$$

When Equation (19) which is a formula for correcting the color information is obtained, the spectral distribution reconstruction unit 141 calculates the tristimulus values XYZ with respect to all pixels of the object area in the input image. Moreover, the albedo correction unit 142 calculates the corrected tristimulus values X'Y'Z' using Equation (19). Moreover, the albedo correction unit 142 calculates the corrected R'G'B' (corrected albedo) using Equation (12). That is, the process of correcting all pixel values RGB of an object area in an input image into the pixel values R'G'B' is represented by one linear computation. The formula that performs this linear computation can be referred to as an albedo correction formula. This albedo correction formula can be referred to as a formula for correcting the albedo, expressed in a linear formula using a matrix for correcting the surface reflectance. In this way, by substituting into a correction formula that is based on one linear computation, it is possible to accelerate processing time.

That is, according to the present exemplary embodiment, the albedo correction unit 142 calculates the corrected albedo based on the correction formula (albedo correction formula). Thus, in addition to the advantages of the first exemplary embodiment, it is possible to realize the correction result equivalent to that of the color image processing method according to the first exemplary embodiment at a low computation cost.

Figure 12:
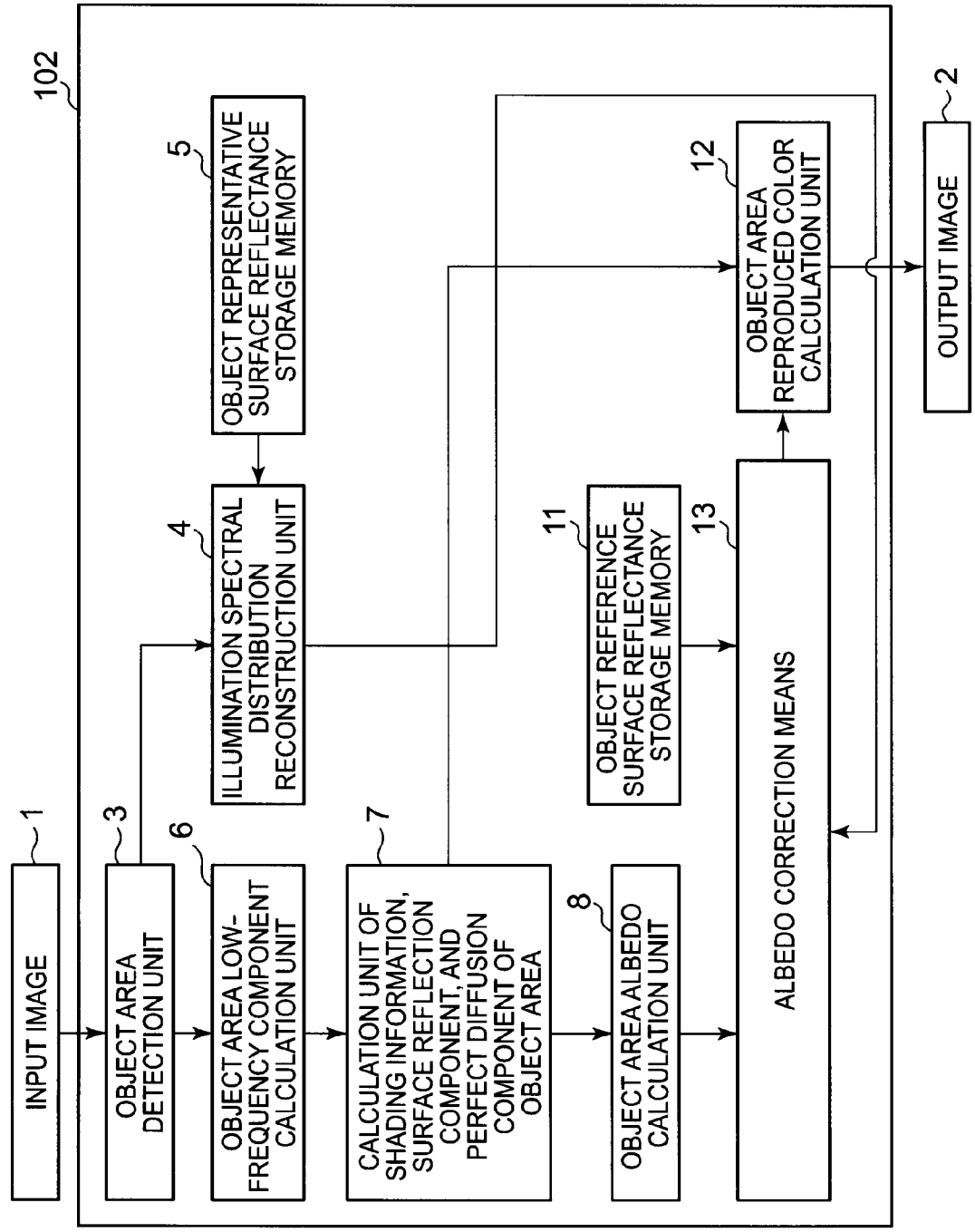
FIG. 12 It depicts an explanatory diagram illustrating an example of a color image processing device applied to the color image processing method according to the second exemplary embodiment.

Next, another modification example of the color image processing device will be described. FIG. 12 is an explanatory diagram illustrating an example of a color image processing device that is applied to the color image processing method according to the second exemplary embodiment. A color image processing device 102 illustrated in FIG. 12 is a device that performs color correction on an input image 1 and outputs an output image 2. The color image processing device 102 includes an object area detection unit 3, a spectral distribution reconstruction unit 4, a representative surface reflectance storage memory 5, a low-frequency component calculation unit 6, a reflection information reconstruction unit 7, an albedo calculation unit 8, an albedo correction unit 13, a reference surface reflectance storage memory 11, and a reproduced color calculation unit 12.

That is, the color image processing device 102 is a device in which the surface reflectance reconstruction unit 9 and the corrected albedo calculation unit 10 of the color image processing device 101 illustrated in FIG. 10 are replaced with the albedo correction unit 13. Thus, hereinafter, the content of only the albedo correction unit 13 will be described.

The albedo correction unit 13 executes the process corresponding to step S9 of FIG. 11 described above. Specifically, the albedo correction unit 13 creates a correction formula, in which Equation (19) or Equations (1), (19), and (12) is expressed in the form of one linear transformation, as the correction formula for correcting the color of the object area. Moreover, the albedo correction unit 13 calculates the corrected albedo obtained by correcting the pixel of the object area using the correction formula.

Next, various exemplary embodiments for realizing the present invention will be described. The color image processing method and device according to the present invention may be realized using a computer. Moreover, the respective processes performed by the color image processing method and the color image processing device according to the present invention may be realized by a combination of at least two of software, hardware, and firmware.

For example, when the color image processing device 100 illustrated in FIG. 2 is realized by a computer using a program, the program (a group of program commands) causes a computer to execute at least the following procedures. Specifically, the program is loaded into a memory of the computer, and the following commands (a) to (e) are executed under the control of the CPU.

(a) An object area detection procedure for detecting an object area which is an area to be subjected to image processing from an input image. This procedure corresponds to the process performed by the image information acquisition unit 110 in FIG. 2.

(b) A reflection component reconstruction procedure for calculating color information of the object area and a perfect diffusion component which is a low-frequency component of the object area and reconstructing a surface reflection component based on the color information and the low-frequency component. This procedure corresponds to the process performed by the reflection information reconstruction unit 120 in FIG. 2.

(c) An albedo calculation procedure for calculating an albedo which is color information obtained by removing shading information which is information that represents luminance of the perfect diffusion component, from the perfect diffusion component. This procedure corresponds to the process performed by the albedo calculation unit 130 in FIG. 2.

(d) An albedo correction processing procedure for reconstructing the surface reflectance of the object area based on the color information and the albedo of the object area and calculating a corrected albedo which is color information obtained by correcting the albedo based on the surface reflectance. This procedure corresponds to the process performed by the albedo correction processing unit 140 in FIG. 2.

(e) A reproduced color calculation procedure for calculating a reproduced color which is color information obtained by adding the shading information and the surface reflection component to the corrected albedo and generating an output image based on the reproduced color. This procedure corresponds to the process performed by the reproduced color calculation unit 150 in FIG. 2.

Specifically, the albedo correction processing procedure may be realized in the following procedures.

(f) A spectral distribution reconstruction procedure for reconstructing a spectral distribution of an illumination from the color information of the object area; (g) a surface reflectance reconstruction procedure for reconstructing the surface reflectance of the object area based on the spectral distribution and the albedo; and (h) a corrected albedo calculation procedure for calculating a corrected albedo based on the surface reflectance.

More specifically, in the corrected albedo calculation procedure, a reproduced surface reflectance which is a reflectance obtained by correcting the surface reflectance based on a reference surface reflectance that is determined in advance for the object area is calculated, and the corrected albedo is calculated based on the reproduced surface reflectance. Further, the reference surface reflectance is stored in the reference surface reflectance storage memory, for example.

More specifically, in the spectral distribution reconstruction procedure, the spectral distribution is reconstructed based on the color information of the object area and a representative surface reflectance that is determined in advance as a representative surface reflectance of the object area.

Further, in the albedo correction processing procedure, for example, as described in the second exemplary embodiment, the corrected albedo may be calculated based on an albedo correction formula which is a formula for correcting the albedo, expressed in a linear formula using a matrix for correcting the surface reflectance. The correction formula is expressed as a matrix formula, for example.

Further, the above-described processes are examples of the processes realized by a program, and the processes performed by the program are not limited to these processes. Further, part of the plurality of processes may be realized by hardware and firmware.

Moreover, the program (the color image processing program) may be provided by recording the program in a recording medium, and also may be provided by transmitting the program via the Internet or the other communication media. Moreover, examples of the storage medium include a flexible disk, a hard disk, a magnetic disk, an opto-magnetic disc, a CD-ROM, a DVD, a ROM cartridge, a RAM memory cartridge with a battery backup, a flash memory cartridge, and a nonvolatile RAM cartridge. Further, examples of the communication media include a wired communication medium such as a telephone line, a radio communication medium such as a microwave line.

As described above, according to the present invention, it is possible to reproduce an area indicated by a specific object in a color image captured by a color imaging device in a desired color. Thus, it is possible to prevent the degradation of the texture of an image and to maintain or improve the texture of the image.

Further, in a color image processing that uses the RGB of color image data and the three attributes of a color such as hue, saturation, and lightness, there is a problem in that the original texture of an object deteriorates. However, the present invention can solve the problem. That is, according to the present invention, it is possible to reproduce the object area in a desired color without deteriorating the texture of the specific object in a color image captured by a color imaging device.

Further, according to the present invention, it is possible to improve the texture of the image using an easier method that uses only an input image without requiring a measurement device such as a fiber-optic spectrometer or a 3-D scanner.

Figure 13:
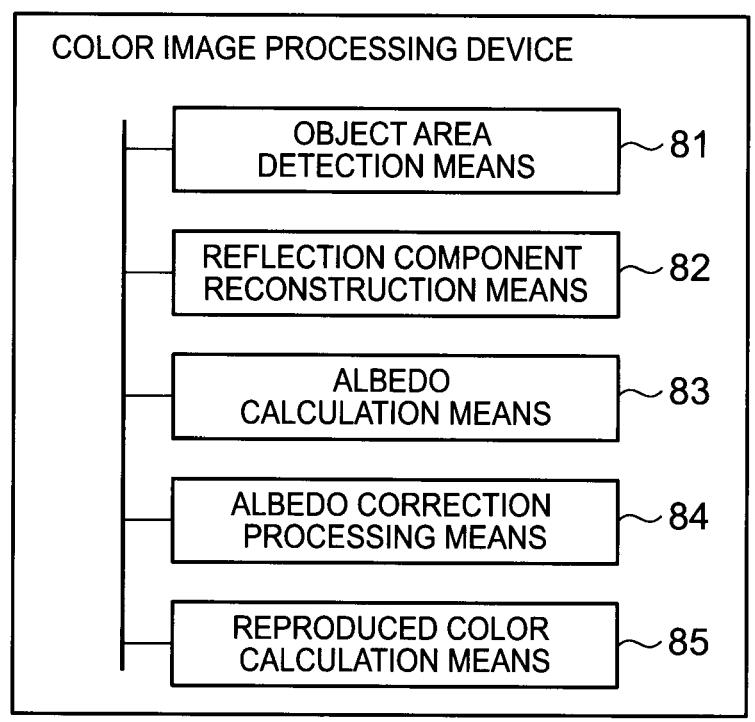
FIG. 13 It depicts a block diagram illustrating an example of minimal configurations of the color image processing device according to the present invention.

Next, an example of minimal configurations of the color image processing device according to the present invention will be described. FIG. 13 is a block diagram illustrating an example of minimal configurations of the color image processing device according to the present invention. The color image processing device according to the present invention includes: an object area detection means 81 (for example, the image information acquisition unit 110) that detects an object area which is an area to be subjected to image processing from an input image; a reflection component reconstruction means 82 (for example, the reflection information reconstruction unit 120) that calculates color information of the object area and a perfect diffusion component which is a low-frequency component of the object area and reconstructs a surface reflection component based on the color information and the low-frequency component (for example, excluding the low-frequency component from the color information); an albedo calculation means 83 (for example, the albedo calculation unit 130) that calculates an albedo which is color information obtained by removing shading information which is information that represents luminance of the perfect diffusion component, from the perfect diffusion component; an albedo correction processing means 84 (for example, the albedo correction processing unit 140) that reconstructs the surface reflectance of the object area based on the color information and the albedo of the object area and calculates a corrected albedo which is color information obtained by correcting the albedo based on the surface reflectance; and a reproduced color calculation means 85 (for example, the reproduced color calculation unit 150) that calculates a reproduced color which is color information obtained by adding the shading information and the surface reflection component to the corrected albedo and generates an output image based on the reproduced color.

With such a configuration, it is possible to reproduce a predetermined object in a color image captured by a color imaging device with a desired color at a low computation cost and to improve the texture.

Part or all of the above exemplary embodiments can be expressed as the following notes, but the invention is not limited thereof.

(Supplementary note 1) A color image processing method comprising: detecting an object area which is an area to be subjected to image processing from an input image; calculating color information of the object area and a perfect diffusion component which is a low-frequency component of the object area; reconstructing a surface reflection component based on the color information and the low-frequency component; calculating an albedo, which is color information obtained by removing shading information which is information that represents luminance of the perfect diffusion component, from the perfect diffusion component; reconstructing a surface reflectance of the object area based on the color information and the albedo of the object area; calculating a corrected albedo which is color information obtained by correcting the albedo based on the surface reflectance; calculating a reproduced color which is color information obtained by adding the shading information and the surface reflection component to the corrected albedo; and generating an output image based on the reproduced color.

(Supplementary note 2) The color image processing method according to Supplementary note 1, wherein when reconstructing the surface reflectance, a spectral distribution of an illumination is reconstructed from the color information of the object area, and the surface reflectance of the object area is reconstructed based on the spectral distribution and the albedo, and when calculating the corrected albedo, the corrected albedo is calculated based on the surface reflectance.

(Supplementary note 3) The color image processing method according to Supplementary note 1 or Supplementary note 2, wherein when calculating the corrected albedo, a reproduced surface reflectance which is a reflectance obtained by correcting the surface reflectance based on a reference surface reflectance that is determined in advance for the object area is calculated, and the corrected albedo is calculated based on the reproduced surface reflectance.

(Supplementary note 4) The color image processing method according to Supplementary note 3, wherein when calculating the corrected albedo, the reproduced surface reflectance is calculated based on three or more reference surface reflectances.

(Supplementary note 5) The color image processing method according to anyone of Supplementary note 2 to Supplementary note 4, wherein when reconstructing the spectral distribution of the illumination, the spectral distribution is reconstructed based on the color information of the object area and a representative surface reflectance that is determined in advance as a representative surface reflectance of the object area.

(Supplementary note 6) The color image processing method according to anyone of Supplementary note 1 to Supplementary note 5, wherein when calculating the corrected albedo, an albedo correction formula which is a formula for correcting the albedo and which is expressed in a linear formula using a matrix for correcting the surface reflectance is generated, and matrix transform using the albedo correction formula is performed on the albedo to thereby calculate the corrected albedo.

(Supplementary note 7) A color image processing device comprising: an object area detection means that detects an object area which is an area to be subjected to image processing from an input image; a reflection component reconstruction means that calculates color information of the object area and a perfect diffusion component which is a low-frequency component of the object area and reconstructs a surface reflection component based on the color information and the low-frequency component; an albedo calculation means that calculates an albedo which is color information obtained by removing shading information which is information that represents luminance of the perfect diffusion component, from the perfect diffusion component; an albedo correction means that reconstructs a surface reflectance of the object area based on the color information and the albedo of the object area and calculates a corrected albedo which is color information obtained by correcting the albedo based on the surface reflectance; and a reproduced color calculation means that calculates a reproduced color which is color information obtained by adding the shading information and the surface reflection component to the corrected albedo and generates an output image based on the reproduced color.

(Supplementary note 8) The color image processing device according to Supplementary note 7, wherein the albedo correction means comprises: a spectral distribution reconstruction means that reconstructs a spectral distribution of an illumination from the color information of the object area; a surface reflectance reconstruction means that reconstructs the surface reflectance of the object area based on the spectral distribution and the albedo; and a corrected albedo calculation means that calculates a corrected albedo based on the surface reflectance.

(Supplementary note 9) The color image processing device according to Supplementary note 8, further including a reference surface reflectance storage means that stores a reference surface reflectance that is determined in advance for the object area, wherein the corrected albedo calculation means calculates a reproduced surface reflectance which is a reflectance obtained by correcting the surface reflectance based on the reference surface reflectance and calculates the corrected albedo based on the reproduced surface reflectance.

(Supplementary note 10) The color image processing device according to Supplementary note 9, wherein the reference surface reflectance storage means stores three or more reference surface reflectances, and the corrected albedo calculation means calculates the reproduced surface reflectance based on the three or more reference surface reflectances.

(Supplementary note 11) The color image processing device according to any one of Supplementary note 7 to Supplementary note 10, wherein the albedo correction means generates an albedo correction formula which is a formula for correcting the albedo and which is expressed in a linear formula using a matrix for correcting the surface reflectance, and performs matrix transform using the albedo correction formula on the albedo to thereby calculate the corrected albedo.

(Supplementary note 12) The color image processing device according to Supplementary note 9, wherein the corrected albedo calculation means generates an albedo correction formula which is a formula for correcting the albedo and which is expressed in a linear formula using a matrix for correcting the surface reflectance based on the calculated reproduced surface reflectance, and calculates the corrected albedo using the correction formula.

(Supplementary note 13) The color image processing device according to any one of Supplementary note 8 to Supplementary note 12, further including a representative surface reflectance storage means that stores a representative surface reflectance, wherein the spectral distribution reconstruction means reconstructs the spectral distribution based on the color information of the object area and the surface reflectance stored in the representative surface reflectance storage means.

(Supplementary note 14) A color image processing program for causing a computer to execute: an object area detection process for detecting an object area which is an area to be subjected to image processing from an input image; a reflection component reconstruction process for calculating color information of the object area and a perfect diffusion component which is a low-frequency component of the object area and reconstructing a surface reflection component based on the color information and the low-frequency component; an albedo calculation process for calculating an albedo which is color information obtained by removing shading information which is information that represents luminance of the perfect diffusion component, from the perfect diffusion component; an albedo correction process for reconstructing a surface reflectance of the object area based on the color information and the albedo of the object area and calculating a corrected albedo which is color information obtained by correcting the albedo based on the surface reflectance; and a reproduced color calculation process for calculating a reproduced color which is color information obtained by adding the shading information and the surface reflection component to the corrected albedo and generating an output image based on the reproduced color.

(Supplementary note 15) The color image processing program according to Supplementary note 14, wherein in the albedo correction process, the color image processing program causes the computer to execute: a spectral distribution reconstruction process for reconstructing a spectral distribution of an illumination from the color information of the object area; a surface reflectance reconstruction process for reconstructing the surface reflectance of the object area based on the spectral distribution and the albedo; and a corrected albedo calculation process for calculating a corrected albedo based on the surface reflectance.

(Supplementary note 16) The color image processing program according to Supplementary note 15, wherein in the corrected albedo calculation process, the color image processing program causes the computer to calculate a reproduced surface reflectance which is a reflectance obtained by correcting the surface reflectance based on a reference surface reflectance that is stored in a reference surface reflectance storage means that stores a reference surface reflectance that is determined in advance for the object area and calculate the corrected albedo based on the reproduced surface reflectance.

(Supplementary note 17) The color image processing program according to Supplementary note 16, wherein in the corrected albedo calculation process, the color image processing program causes the computer to calculate the reproduced surface reflectance based on three or more reference surface reflectances stored in the reference surface reflectance storage means.

(Supplementary note 18) The color image processing program according to any one of Supplementary note 15 to Supplementary note 17, wherein in the spectral distribution reconstruction process, the color image processing program causes the computer to reconstruct the spectral distribution based on the color information of the object area and a representative surface reflectance that is determined in advance as a representative surface reflectance of the object area.

(Supplementary note 19) The color image processing program according to any one of Supplementary note 14 to Supplementary note 18, wherein in the corrected albedo calculation process, the color image processing program causes the computer to generate an albedo correction formula which is a formula for correcting the albedo and which is expressed in a linear formula using a matrix for correcting the surface reflectance and perform matrix transform using the albedo correction formula on the albedo to thereby calculate the corrected albedo.

Although the present invention has been described with reference to the exemplary embodiments, the present invention is not limited to the exemplary embodiments described above. Various modifications which can be understood by one skilled in the art can be made in the configuration and details of the present invention within the scope of the present invention.

This application is based upon and claims the benefit of priority from Japanese patent application No. 2010-149233, filed on Jun. 30, 2010, the disclosure of which is incorporated herein in its entirety by reference.

INDUSTRIAL APPLICABILITY

The present invention can be suitably applied to functions that realize color correction in color image input/output devices. Moreover, the present invention can be embodied as color correction software or utilities for optional color images by embodying the present invention in the form of a program running on a computer system.

REFERENCE SIGNS LIST

1: Input image
2: Output image
3: Object area detection unit
4: Illumination spectral distribution reconstruction unit
5: Object representative surface reflectance storage memory
6: Object area low-frequency component calculation unit
7: Calculation unit of shading information, surface reflection component, and perfect diffusion component of object area
8: Object area albedo calculation unit
9: Object area surface reflectance reconstruction unit
10: Corrected albedo calculation unit based on surface reflectance correction
11: Object reference surface reflectance storage memory
12: Object area reproduced color calculation unit
13: Albedo correction means
100, 101, 102: Color image processing device
110: Image information acquisition unit 120: Reflection information reconstruction unit
130: Albedo calculation unit
140: Albedo correction processing unit
141: Spectral distribution reconstruction unit
142: Albedo correction unit
150: Reproduced color calculation unit

What is claimed is:

1. A color image processing method comprising:
   detecting an object area which is an area to be subjected to image processing from an input image;
   calculating color information of the object area and a perfect diffusion component which is a low-frequency component of the object area;
   reconstructing a surface reflection component based on the color information and the low-frequency component;
   calculating an albedo, which is color information obtained by removing shading information which is information that represents luminance of the perfect diffusion component, from the perfect diffusion component;
   reconstructing a surface reflectance of the object area based on the color information and the albedo of the object area;
   calculating a corrected albedo which is color information obtained by correcting the albedo based on the surface reflectance;
   calculating a reproduced color which is color information obtained by adding the shading information and the surface reflection component to the corrected albedo; and
   generating an output image based on the reproduced color.

2. The color image processing method according to claim 1,
   wherein when reconstructing the surface reflectance, a spectral distribution of an illumination is reconstructed from the color information of the object area, and the surface reflectance of the object area is reconstructed based on the spectral distribution and the albedo, and
   when calculating the corrected albedo, the corrected albedo is calculated based on the surface reflectance.

3. The color image processing method according to claim 2,
   wherein when reconstructing the spectral distribution of the illumination, the spectral distribution is reconstructed based on the color information of the object area and a representative surface reflectance that is determined in advance as a representative surface reflectance of the object area.

4. The color image processing method according to claim 1,
   wherein when calculating the corrected albedo, a reproduced surface reflectance which is a reflectance obtained by correcting the surface reflectance based on a reference surface reflectance that is determined in advance for the object area is calculated, and the corrected albedo is calculated based on the reproduced surface reflectance.

5. The color image processing method according to claim 4,
   wherein when calculating the corrected albedo, the reproduced surface reflectance is calculated based on three or more reference surface reflectances.

6. The color image processing method according to claim 1,
   wherein when calculating the corrected albedo, an albedo correction formula which is a formula for correcting the albedo and which is expressed in a linear formula using a matrix for correcting the surface reflectance is generated, and matrix transform using the albedo correction formula is performed on the albedo to thereby calculate the corrected albedo.

7. A color image processing device comprising:
   an object area detection unit that detects an object area which is an area to be subjected to image processing from an input image;
   a reflection component reconstruction unit that calculates color information of the object area and a perfect diffusion component which is a low-frequency component of the object area and reconstructs a surface reflection component based on the color information and the low-frequency component;
   an albedo calculation unit that calculates an albedo which is color information obtained by removing shading information which is information that represents luminance of the perfect diffusion component, from the perfect diffusion component;
   an albedo correction unit that reconstructs a surface reflectance of the object area based on the color information and the albedo of the object area and calculates a corrected albedo which is color information obtained by correcting the albedo based on the surface reflectance; and
   a reproduced color calculation unit that calculates a reproduced color which is color information obtained by adding the shading information and the surface reflection component to the corrected albedo and generates an output image based on the reproduced color.

8. The color image processing device according to claim 7, wherein the albedo correction unit comprises:
   a spectral distribution reconstruction unit that reconstructs a spectral distribution of an illumination from the color information of the object area;
   a surface reflectance reconstruction unit that reconstructs the surface reflectance of the object area based on the spectral distribution and the albedo; and
   a corrected albedo calculation unit that calculates a corrected albedo based on the surface reflectance.

9. A computer readable information recording medium storing a color image processing program, when executed by a processor, performs a method for:
   detecting an object area which is an area to be subjected to image processing from an input image;
   calculating color information of the object area and a perfect diffusion component which is a low-frequency component of the object area;
   reconstructing a surface reflection component based on the color information and the low-frequency component;
   calculating an albedo, which is color information obtained by removing shading information which is information that represents luminance of the perfect diffusion component, from the perfect diffusion component;
   reconstructing a surface reflectance of the object area based on the color information and the albedo of the object area;
   calculating a corrected albedo which is color information obtained by correcting the albedo based on the surface reflectance;
   calculating a reproduced color which is color information obtained by adding the shading information and the surface reflection component to the corrected albedo; and
   generating an output image based on the reproduced color.

10. The computer readable information recording medium according to claim 9, wherein when reconstructing the surface reflectance, a spectral distribution of an illumination is reconstructed from the color information of the object area, and the surface reflectance of the object area is reconstructed based on the spectral distribution and the albedo, and
when calculating the corrected albedo, the corrected albedo is calculated based on the surface reflectance.

* * * * *